United States Patent
Mcdermott

(10) Patent No.: US 12,527,913 B2
(45) Date of Patent: Jan. 20, 2026

(54) SYSTEM, METHOD, AND COMPUTER PROGRAM FOR OCCLUSION DETECTION AND IMPROVED PRESSURE LIMITING BEHAVIOR FOR FLUID INJECTOR DEVICES

(71) Applicant: BAYER HEALTHCARE LLC, Whippany, NJ (US)

(72) Inventor: Michael Mcdermott, Berlin (DE)

(73) Assignee: BAYER HEALTHCARE LLC, Whippany, NJ (US)

( * ) Notice: Subject to any disclaimer, the term of this patent is extended or adjusted under 35 U.S.C. 154(b) by 841 days.

(21) Appl. No.: 17/776,301

(22) PCT Filed: Nov. 18, 2020

(86) PCT No.: PCT/US2020/060970
§ 371 (c)(1),
(2) Date: May 12, 2022

(87) PCT Pub. No.: WO2021/101939
PCT Pub. Date: May 27, 2021

(65) Prior Publication Data
US 2022/0395634 A1 Dec. 15, 2022

Related U.S. Application Data

(60) Provisional application No. 62/938,407, filed on Nov. 21, 2019.

(51) Int. Cl.
*A61M 5/168* (2006.01)

(52) U.S. Cl.
CPC .................. *A61M 5/16854* (2013.01); *A61M 2005/16863* (2013.01)

(58) Field of Classification Search
CPC .... A61M 5/16831; A61M 2005/16863; A61M 5/16854; A61M 2005/16868; A61M 2005/16872
See application file for complete search history.

(56) References Cited

U.S. PATENT DOCUMENTS

| 3,701,345 A | 10/1972 | Heilman et al. |
| 4,006,736 A | 2/1977 | Kranys et al. |
| (Continued) | | |

FOREIGN PATENT DOCUMENTS

| EP | 2985047 A1 | 2/2016 |
| WO | 2013176770 A2 | 11/2013 |
| (Continued) | | |

OTHER PUBLICATIONS

"International Preliminary Report on Patentability from PCT Application No. PCT/US2020/060970", Jun. 2, 2022.

*Primary Examiner* — William R Carpenter
(74) *Attorney, Agent, or Firm* — Joseph L. Kent; James R. Stevenson

(57) ABSTRACT

A system, method, and computer program product are disclosed for occlusion detection and/or pressure limiting in a fluid injector system. A fluid injector system may include at least one fluid injector device, one or more drive components, and a control device. The control device may comprise at least one processor programmed or configured to: provide instructions to the fluid injector system to deliver fluid from the at least one fluid injector device at a predetermined fluid flow rate, determine a first fluid pressure measurement within the at least one fluid injector device at a first time, determine a second fluid pressure measurement within the at least one fluid injector at a second time, determine a pressure differential between the first fluid pressure measurement and the second fluid pressure measurement, calculate a change in compliance volume of the at (Continued)

least one fluid injector device based on the determined pressure differential, compare the calculated change in compliance volume with the predetermined fluid flow rate, repeat the steps throughout the fluid injection procedure, and determine whether an occlusion or a partial occlusion has occurred downstream of the at least one fluid injector device.

14 Claims, 12 Drawing Sheets

(56) References Cited

U.S. PATENT DOCUMENTS

| | | | |
|---|---|---|---|
| 7,553,294 B2 | 6/2009 | Azzaro et al. | |
| 7,563,249 B2 | 7/2009 | Schriver et al. | |
| 8,439,863 B2 | 5/2013 | Fago et al. | |
| 8,945,051 B2 | 2/2015 | Schriver et al. | |
| 9,173,995 B1 | 11/2015 | Tucker et al. | |
| 9,242,083 B2 | 1/2016 | Fago et al. | |
| 10,124,110 B2 | 11/2018 | Dedig et al. | |
| 10,507,319 B2 | 12/2019 | Haury et al. | |
| 10,549,084 B2 | 2/2020 | Sokolov et al. | |
| 10,583,256 B2 | 3/2020 | Berry et al. | |
| 2001/0023345 A1* | 9/2001 | Wolff | A61M 5/16854 604/151 |
| 2004/0015124 A1 | 1/2004 | Sciulli et al. | |
| 2011/0137241 A1 | 6/2011 | Delcastilio et al. | |
| 2011/0318198 A1* | 12/2011 | Johnson | F04B 49/065 417/300 |
| 2014/0088555 A1 | 3/2014 | Li et al. | |
| 2014/0114236 A1 | 4/2014 | Gordon | |
| 2014/0224829 A1 | 8/2014 | Capone et al. | |
| 2014/0276550 A1 | 9/2014 | Uram et al. | |
| 2015/0190573 A1 | 7/2015 | Moberg et al. | |
| 2016/0331951 A1 | 11/2016 | Sokolov et al. | |
| 2017/0035974 A1 | 2/2017 | Berry et al. | |
| 2018/0161496 A1 | 6/2018 | Berry et al. | |
| 2018/0221575 A1* | 8/2018 | Wolff | A61M 5/16854 |
| 2018/0228967 A1* | 8/2018 | Hopkins | A61M 5/172 |
| 2019/0022306 A1 | 1/2019 | Gibson et al. | |

FOREIGN PATENT DOCUMENTS

| | | |
|---|---|---|
| WO | 2015048093 A2 | 4/2015 |
| WO | 2016112163 A1 | 7/2016 |
| WO | 2019046299 A1 | 3/2019 |
| WO | 2019204605 A1 | 10/2019 |

* cited by examiner

SYSTEM, METHOD, AND COMPUTER PROGRAM FOR OCCLUSION DETECTION AND IMPROVED PRESSURE LIMITING BEHAVIOR FOR FLUID INJECTOR DEVICES

CROSS-REFERENCE TO RELATED APPLICATIONS

This application is a U.S. national phase application under 35 U.S.C. § 371 of PCT International Application No. PCT/US2020/060970, filed 18 Nov. 2020, and claims the benefit of U.S. Provisional Patent Application No. 62/938,407, filed 21 Nov. 2019, the disclosures of which are hereby incorporated herein by reference in their entirety.

BACKGROUND OF THE DISCLOSURE

1. Field of the Disclosure

This disclosure relates generally to systems, devices, products, apparatus, and methods that are used for improved occlusion detection and/or improved pressure limiting behavior for fluid injection devices.

2. Description of the Related Art

In many medical diagnostic and therapeutic procedures, a medical practitioner, such as a physician or radiologist, injects a patient with one or more fluids using a powered fluid injector system. A number of powered fluid injector systems for pressurized injection of fluids have been developed for use in procedures such as angiography, computed tomography (CT), molecular imaging (such as PET imaging), and magnetic resonance imaging (MRI).

On occasion, occlusions (i.e., substantial blockages in fluid flow) may occur at a location in-line between a powered fluid injector system and the injection site (e.g., a patient catheter). Conventional fluid injector systems have relied upon pressure monitoring alone to account for such occlusions. That is, when a predetermined pressure limit is reached during an injection procedure (as would eventually be caused by the occlusion), the fluid flow rate is stepped down so as to reduce the system pressure. However, because the predetermined pressure limit is selected for the actual fluid injector system as opposed to the injection site and/or intermediate components (e.g., tubing, etc.), the occlusion location may be subjected to much higher pressures than desired before a pressure limit of the fluid injector system is reached.

Additionally, conventional fluid injector systems are typically programmed to monitor the change in pressure until the predetermined pressure limit is reached, at which point the fluid flow rate may be reduced a corresponding percentage. However, the needed reduction in flow rate is often overestimated, resulting in frequent motor speed changes (which may reduce the life of the motors) and possibly impacting iodine delivery rate (IDR) to an extent that an imaging procedure cannot be successfully completed.

Accordingly, there is a need in the art to improve occlusion detection and pressure limiting behavior for fluid injection devices.

SUMMARY OF THE DISCLOSURE

Accordingly, provided are systems, devices, products, apparatus, and/or methods for a fluid injector system that provides for improved occlusion detection and/or pressure limiting behaviors.

In some non-limiting embodiments or aspects, a fluid injector system configured for use in administering at least one fluid in a fluid injection procedure is disclosed. The fluid injector system may include: at least one fluid injector device; one or more drive components; and a control device which may include at least one processor programmed or configured to: provide instructions to the fluid injector system to deliver fluid from the at least one fluid injector device at a predetermined fluid flow rate, determine a first fluid pressure measurement within the at least one fluid injector device at a first time, determine a second fluid pressure measurement within the at least one fluid injector at a second time, determine a pressure differential between the first fluid pressure measurement and the second fluid pressure measurement, calculate a change in compliance volume of the at least one fluid injector device based on the pressure differential, compare the calculated change in compliance volume with the predetermined fluid flow rate, repeat the steps throughout the fluid injection procedure, determine whether an occlusion or a partial occlusion has occurred downstream of the at least one fluid injector device and, if the occlusion or a partial occlusion is determined to have occurred, the at least one processor is programmed or configured to reduce or stop a delivery rate of the at least one piston of the at least one fluid injector device.

In some non-limiting embodiments or aspects, the operation data may include one or more operation parameters associated with at least one of: the one or more drive components of the fluid injector system, one or more of the at least one fluid injector device, and one or more disposable components configured for use with the fluid injector device.

In some non-limiting embodiments or aspects, the at least one fluid injector device may include: at least one fluid reservoir; and at least one plunger associated with the at least one fluid reservoir, wherein the at least one plunger is releasably engageable with a piston the fluid injector system.

In some non-limiting embodiments or aspects, if the calculated change in compliance volume is equal to a predetermined threshold of a volumetric component of the predetermined fluid flow rate, it may be determined that an occlusion has occurred downstream of the at least one fluid injector device. For example, the control device can determine the occlusion has occurred if the calculated change in compliance volume is equal to or greater than a predetermined threshold of a volumetric component of the predetermined fluid flow rate.

In some non-limiting embodiments or aspects, the controller may compare the calculated change in compliance with the predetermined fluid flow rate to determine a true flow rate measurement. In various embodiments, if the calculated true flow rate is less than or equal to a predetermined percentage of the predetermined fluid flow rate, it is determined that an occlusion has occurred downstream of the at least one fluid injector device.

In some non-limiting embodiments or aspects, if the calculated change in compliance volume is within and/or approaching a predetermined threshold of a volumetric component of the predetermined fluid flow rate, it is determined that an at least partial occlusion may occur or has occurred downstream of the at least one fluid injector device.

In some non-limiting embodiments or aspects, the at least one processor may be programmed or configured to reduce a delivery rate of the at least one piston of the at least one fluid injector device if the change in calculated compliance volume is within and/or approaching the predetermined threshold of the volumetric component of the predetermined fluid flow rate.

In some non-limiting embodiments or aspects, the at least one processor may be programmed or configured to determine when a pre-programmed pressure limit of the at least one fluid injector device has been reached.

In some non-limiting embodiments or aspects, the at least one processor may be programmed or configured to subtract the calculated change in compliance volume from a volumetric component of the delivery rate of the at least one piston of the at least one fluid injector device to determine a true fluid flow rate out of the at least one fluid injector device.

In some non-limiting embodiments or aspects, the at least one processor may be programmed or configured to adjust the delivery rate of the at least one piston of the at least one fluid injector device so the determined true fluid flow rate is substantially the same as the predetermined fluid flow rate.

In some non-limiting embodiments or aspects, a computer-implemented method of at least partial occlusion detection and pressure limiting for a fluid injector system configured for use in administering at least one fluid in a fluid injection procedure is disclosed. The method may include: providing, with a control device comprising at least one processor, instructions to the fluid injector system to deliver fluid from at least one fluid injector device at a predetermined fluid flow rate; determining a first fluid pressure measurement within the at least one fluid injector device at a first time; determining a second fluid pressure measurement within the at least one fluid injector device at a second time; determining, with the control device, a pressure differential between the first fluid pressure measurement and the second fluid pressure measurement; calculating, with the control device, a change in compliance volume of the at least one fluid injector device based on the pressure differential; comparing, with the control device, the calculated change in compliance volume with the predetermined fluid flow rate; repeating the method steps throughout the fluid injection procedure; and determining whether an occlusion or a partial occlusion has occurred downstream of the at least one fluid injector device and, if the occlusion or a partial occlusion is determined to have occurred, the at least one processor is programmed or configured to reduce or stop a delivery rate of the at least one piston of the at least one fluid injector device.

In some non-limiting embodiments or aspects, the method may further include determining, with the control device, that an occlusion has occurred if the calculated change in compliance volume is equal to or greater than a predetermined threshold of a volumetric component of the predetermined fluid flow rate.

In some non-limiting embodiments or aspects, the method may further include comparing the calculated change in compliance volume with the predetermined fluid flow rate to determine a true flow rate measurement. In specific embodiments, the method may further comprise determining, with the control device, that an occlusion has occurred if the calculated true flow rate is less than or equal to a predetermined percentage of the predetermined fluid flow rate.

In some non-limiting embodiments or aspects, the method may further include determining, with the control device, that an occlusion has occurred if the calculated true flow rate is less than or equal to a predetermined percentage of the predetermined fluid flow rate.

In some non-limiting embodiments or aspects, the method may further include determining, with the control device, when a pre-programmed pressure limit of the at least one fluid injector device has been reached.

In some non-limiting embodiments or aspects, the first time at which the first fluid pressure measurement is determined may be a time before the pre-programmed pressure limit is reached, and wherein the second time at which the second fluid pressure measurement is determined is a time at which or after the pre-programmed pressure limit is reached.

In some non-limiting embodiments or aspects, the method may further include subtracting, with the control device, the calculated change in compliance volume from a volumetric component of the delivery rate of at least one piston of the at least one fluid injector device to determine a true fluid flow rate out of the at least one fluid injector device.

In some non-limiting embodiments or aspects, the method may further include adjusting, with the control device, the delivery rate of the at least one piston of the at least one fluid injector device so the determined true fluid flow rate is substantially the same as the predetermined fluid flow rate.

In some non-limiting embodiments or aspects, a computer program product for at least partial occlusion detection and pressure limiting of a fluid injector system configured for use in administering at least one fluid in a fluid injection procedure is disclosed. The computer program product may include at least one non-transitory computer-readable medium which may include one or more instructions that, when executed by at least one processor, cause the at least one processor to: provide instructions to the fluid injector system to deliver fluid from at least one fluid injector device at a predetermined fluid flow rate; determine a first fluid pressure measurement within the at least one fluid injector device at a first time; determine a second fluid pressure measurement within the at least one fluid injector device at a second time; determine a pressure differential between the first fluid pressure measurement and the second fluid pressure measurement; calculate a change in compliance volume of the at least one fluid injector device based on the determined pressure differential; compare the calculated change in compliance volume with the predetermined fluid flow rate; repeat the steps through the fluid injection procedure, and determine whether an occlusion or a partial occlusion has occurred downstream of the at least one fluid injector device and, if the occlusion or a partial occlusion is determined to have occurred, the at least one processor is programmed or configured to reduce or stop a delivery rate of the at least one piston of the at least one fluid injector device.

In some non-limiting embodiments or aspects, the one or more instructions, when executed by the at least one processor, cause the at least one processor to determine the occlusion has occurred if the calculated change in compliance volume is equal to or greater than a predetermined threshold of a volumetric component of the predetermined fluid flow rate.

In some non-limiting embodiments or aspects, the one or more instructions, when executed by the at least one processor, may cause the at least one processor to calculate a change in compliance volume is compared the predetermined fluid flow rate to determine a true flow rate measurement. In specific embodiments, the one or more instructions, when executed by the at least one processor, to determine that an occlusion has occurred downstream of the at least one fluid injector device if the calculated true flow rate is less than or equal to a predetermined percentage of the predetermined fluid flow rate.

In some non-limiting embodiments or aspects, the one or more instructions, when executed by the at least one processor, may cause the at least one processor to reduce a delivery rate of at least one piston of the at least one fluid injector device if the calculated change in compliance volume is within and/or approaching the predetermined threshold of the volumetric component of the predetermined fluid flow rate.

In some non-limiting embodiments or aspects, the one or more instructions, when executed by the at least one processor, may cause the at least one processor to determine when a pre-programmed pressure limit of the at least one fluid injector device has been reached.

In some non-limiting embodiments or aspects, the one or more instructions, when executed by the at least one processor, may cause the at least one processor to subtract the calculated change in compliance volume from a volumetric component of the delivery rate of at least one piston of the at least one fluid injector device to determine a true fluid flow rate out of the at least one fluid injector device.

In some non-limiting embodiments or aspects, the one or more instructions, when executed by the at least one processor, may cause the at least one processor to adjust the delivery rate of the at least one piston of the at least one fluid injector device so the determined true fluid flow rate is substantially the same as the predetermined fluid flow rate.

In some non-limiting embodiments or aspects, a fluid injector system configured for use in administering at least one fluid in a fluid injection procedure is disclosed. The fluid injector system may include: at least one fluid injector device; one or more drive components; and a control device comprising at least one processor programmed or configured to: provide instructions to the fluid injector system to deliver fluid from the at least one fluid injector device at a predetermined fluid flow rate, determine a fluid flow rate within the at least one fluid injector device at a first time, monitor the fluid flow rate within the at least one fluid injector until a second time, calculate an actual fluid flow rate delivered out of the at least one fluid injector device based on the flow rate across a time interval between the first time and the second time, compare the calculated actual fluid flow rate with the predetermined fluid flow rate, and repeat the steps throughout the fluid injection procedure.

In some non-limiting embodiments or aspects, the operation data may include one or more operation parameters associated with at least one of: the one or more drive components of the fluid injector system, one or more of the at least one fluid injector device, and one or more disposable components configured for use with the fluid injector device.

In some non-limiting embodiments or aspects, the at least one fluid injector device may include: at least one fluid reservoir; and at least one plunger associated with the at least one fluid reservoir, wherein the at least one plunger is releasably engageable with a piston the fluid injector system.

In some non-limiting embodiments or aspects, if the calculated actual fluid flow rate delivered out of the at least one fluid injector device is not equal to a predetermined threshold of the predetermined fluid flow rate, it may be determined that an occlusion has occurred downstream of the at least one fluid injector device.

In some non-limiting embodiments or aspects, the at least one processor may be programmed or configured to reduce or stop a delivery rate of the at least one piston of the at least one fluid injector device if an occlusion is detected.

In some non-limiting embodiments or aspects, if the actual fluid flow rate is within and/or approaching a predetermined threshold of the predetermined fluid flow rate, it may be determined that an at least partial occlusion may occur or has occurred downstream of the at least one fluid injector device.

In some non-limiting embodiments or aspects, the at least one processor may be programmed or configured to reduce a delivery rate of the at least one piston of the at least one fluid injector device if the actual fluid flow rate is within and/or approaching the predetermined threshold of the predetermined fluid flow rate.

Further non-limiting embodiments are set forth in the following numbered clauses:

Clause 1. A fluid injector system configured for use in administering at least one fluid in a fluid injection procedure, the fluid injector system comprising: at least one fluid injector device; one or more drive components; and a control device comprising at least one processor programmed or configured to: provide instructions to the fluid injector system to deliver fluid from the at least one fluid injector device at a predetermined fluid flow rate, determine a first fluid pressure measurement within the at least one fluid injector device at a first time, determine a second fluid pressure measurement within the at least one fluid injector at a second time, determine a pressure differential between the first fluid pressure measurement and the second fluid pressure measurement, calculate a change in compliance volume of the at least one fluid injector device based on the pressure differential, compare the calculated change in compliance volume with the predetermined fluid flow rate, repeat the steps throughout the fluid injection procedure, and determine whether an occlusion or a partial occlusion has occurred downstream of the at least one fluid injector device and, if the occlusion or a partial occlusion is determined to have occurred, the at least one processor is programmed or configured to reduce or stop a delivery rate of the at least one piston of the at least one fluid injector device.

Clause 2. The fluid injector system of clause 1, wherein the control device determines the occlusion has occurred if the calculated change in compliance volume is equal to or greater than a predetermined threshold of a volumetric component of the predetermined fluid flow rate.

Clause 3. The fluid injector system of clause 1 or 2, wherein the calculated change in compliance volume is compared the predetermined fluid flow rate to determine a true flow rate measurement.

Clause 4. The fluid injector system of clause 3, wherein if the calculated true flow rate is less than or equal to a predetermined percentage of the predetermined fluid flow rate, it is determined that an occlusion has occurred downstream of the at least one fluid injector device.

Clause 5. The fluid injector system of clause 1, wherein if the calculated change in compliance volume is within and/or approaching a predetermined threshold of a volumetric component of the predetermined fluid flow rate, it is determined that an at least partial occlusion may occur or has occurred downstream of the at least one fluid injector device.

Clause 6. The fluid injector system of clause 5, wherein the at least one processor is programmed or configured to reduce a delivery rate of the at least one piston of the at least one fluid injector device if the change in calculated compliance volume is within and/or approaching the predetermined threshold of the volumetric component of the predetermined fluid flow rate.

Clause 7. The fluid injector system of any of clauses 1 to 6, wherein the at least one processor is programmed or configured to determine when a pre-programmed pressure limit of the at least one fluid injector device has been reached.

Clause 8. The fluid injector system of any of clauses 1 to 7, wherein the at least one processor is programmed or configured to subtract the calculated change in compliance volume from a volumetric component of the delivery rate of the at least one piston of the at least one fluid injector device to determine a true fluid flow rate out of the at least one fluid injector device.

Clause 9. The fluid injector system of clause 8, wherein the at least one processor is programmed or configured to adjust the delivery rate of the at least one piston of the at least one fluid injector device so the determined true fluid flow rate is substantially the same as the predetermined fluid flow rate.

Clause 10. A computer-implemented method of at least partial occlusion detection and pressure limiting for a fluid injector system configured for use in administering at least one fluid in a fluid injection procedure, the method comprising: providing, with a control device comprising at least one processor, instructions to the fluid injector system to deliver fluid from at least one fluid injector device at a predetermined fluid flow rate; determining a first fluid pressure measurement within the at least one fluid injector device at a first time; determining a second fluid pressure measurement within the at least one fluid injector device at a second time; determining, with the control device, a pressure differential between the first fluid pressure measurement and the second fluid pressure measurement; calculating, with the control device, a change in compliance volume of the at least one fluid injector device based on the pressure differential; comparing, with the control device, the calculated change in compliance volume with the predetermined fluid flow rate; repeating the method steps throughout the fluid injection procedure; and determining whether an occlusion or a partial occlusion has occurred downstream of the at least one fluid injector device and, if the occlusion or a partial occlusion is determined to have occurred, the at least one processor is programmed or configured to reduce or stop a delivery rate of the at least one piston of the at least one fluid injector device.

Clause 11. The computer-implemented method of clause 10, further comprising determining, with the control device, that an occlusion has occurred if the calculated change in compliance volume is equal to or greater than a predetermined threshold of a volumetric component of the predetermined fluid flow rate.

Clause 12. The computer-implemented method of clause 10 or 11, further comprising comparing the calculated change in compliance volume with the predetermined fluid flow rate to determine a true flow rate measurement.

Clause 13. The computer-implemented method of clause 12, further comprising determining, with the control device, that an occlusion has occurred if the calculated true flow rate is less than or equal to a predetermined percentage of the predetermined fluid flow rate.

Clause 14. The computer-implemented method of claim 10, further comprising reducing, with the control device, a delivery rate of at least one piston of the at least one fluid injector device if the calculated change in compliance volume is within and/or approaching the predetermined threshold of the volumetric component of the predetermined fluid flow rate.

Clause 15. The computer-implemented method of any of clauses 10 to 14, further comprising determining, with the control device, when a pre-programmed pressure limit of the at least one fluid injector device has been reached.

Clause 16. The computer-implemented method of clause 15, wherein the first time at which the first fluid pressure measurement is determined is a time before the pre-programmed pressure limit is reached, and wherein the second time at which the second fluid pressure measurement is determined is a time at which or after the pre-programmed pressure limit is reached.

Clause 17. The computer-implemented method of any of clauses 10 to 16, further comprising subtracting, with the control device, the calculated change in compliance volume from a volumetric component of the delivery rate of at least one piston of the at least one fluid injector device to determine a true fluid flow rate out of the at least one fluid injector device.

Clause 18. The computer-implemented method of clause 17, further comprising adjusting, with the control device, the delivery rate of the at least one piston of the at least one fluid injector device so the determined true fluid flow rate is substantially the same as the predetermined fluid flow rate.

Clause 19. A computer program product for at least partial occlusion detection and pressure limiting of a fluid injector system configured for use in administering at least one fluid in a fluid injection procedure, the computer program product comprising at least one non-transitory computer-readable medium comprising one or more instructions that, when executed by at least one processor, cause the at least one processor to: provide instructions to the fluid injector system to deliver fluid from at least one fluid injector device at a predetermined fluid flow rate; determine a first fluid pressure measurement within the at least one fluid injector device at a first time; determine a second fluid pressure measurement within the at least one fluid injector device at a second time; determine a pressure differential between the first fluid pressure measurement and the second fluid pressure measurement; calculate a change in compliance volume of the at least one fluid injector device based on the determined pressure differential; compare the calculated change in compliance volume with the predetermined fluid flow rate; repeat the steps through the fluid injection procedure; and determine whether an occlusion or a partial occlusion has occurred downstream of the at least one fluid injector device and, if the occlusion or a partial occlusion is determined to have occurred, the at least one processor is programmed or configured to reduce or stop a delivery rate of the at least one piston of the at least one fluid injector device.

Clause 20. The computer program product of clause 19, wherein the one or more instructions, when executed by the at least one processor, cause the at least one processor to determine if the calculated change in compliance volume is equal to, within, or greater than a predetermined threshold of a volumetric component of the predetermined fluid flow rate.

Clause 21. The computer program product of clause 19 or 20, wherein the one or more instructions, when executed by the at least one processor, cause the at least one processor to calculate a change in compliance volume is compared the predetermined fluid flow rate to determine a true flow rate measurement.

Clause 22. The computer program product of clause 21, wherein the one or more instructions, when executed by the at least one processor, to determine that an occlusion has occurred downstream of the at least one fluid injector device if the calculated true flow rate is less than or equal to a predetermined percentage of the predetermined fluid flow rate.

Clause 23. The computer program product of clause 19, wherein the one or more instructions, when executed by the at least one processor, cause the at least one processor to reduce a delivery rate of at least one piston of the at least one fluid injector device if the calculated change in compliance volume is within and/or approaching the predetermined threshold of the volumetric component of the predetermined fluid flow rate.

Clause 24. The computer program product of any of clauses 19 to 23, wherein the one or more instructions, when executed by the at least one processor, cause the at least one processor to determine when a pre-programmed pressure limit of the at least one fluid injector device has been reached.

Clause 25. The computer program product of any of clauses 21 to 24, wherein the one or more instructions, when executed by the at least one processor, cause the at least one processor to subtract the calculated change in compliance volume from a volumetric component of the delivery rate of at least one piston of the at least one fluid injector device to determine a true fluid flow rate out of the at least one fluid injector device.

Clause 26. The computer program product of clause 25, wherein the one or more instructions, when executed by the at least one processor, cause the at least one processor to adjust the delivery rate of the at least one piston of the at least one fluid injector device so the determined true fluid flow rate is substantially the same as the predetermined fluid flow rate.

Clause 27. A fluid injector system configured for use in administering at least one fluid in a fluid injection procedure, the fluid injector system comprising: at least one fluid injector device; one or more drive components; and a control device comprising at least one processor programmed or configured to: provide instructions to the fluid injector system to deliver fluid from the at least one fluid injector device at a predetermined fluid flow rate, determine a fluid flow rate within the at least one fluid injector device at a first time, monitor the fluid flow rate within the at least one fluid injector until a second time, calculate an actual fluid flow rate delivered out of the at least one fluid injector device based on the flow rate across a time interval between the first time and the second time, compare the calculated actual fluid flow rate with the predetermined fluid flow rate, repeat the steps throughout the fluid injection procedure, and determine whether an occlusion or a partial occlusion has occurred downstream of the at least one fluid injector device and, if the occlusion or a partial occlusion is determined to have occurred, the at least one processor is programmed or configured to reduce or stop a delivery rate of the at least one piston of the at least one fluid injector device.

Clause 28. The fluid injector system of clause 27, wherein if the calculated actual fluid flow rate delivered out of the at least one fluid injector device is not equal to a predetermined threshold of the predetermined fluid flow rate, it is determined that an occlusion has occurred downstream of the at least one fluid injector device.

Clause 29. The fluid injector system of clause 27 or 28, wherein if the actual fluid flow rate is within and/or approaching a predetermined threshold of the predetermined fluid flow rate, it is determined that an at least partial occlusion may occur or has occurred downstream of the at least one fluid injector device.

Clause 30. The fluid injector system of clause 29, wherein the at least one processor is programmed or configured to reduce a delivery rate of the at least one piston of the at least one fluid injector device if the actual fluid flow rate is within and/or approaching the predetermined threshold of the predetermined fluid flow rate.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying schematic figures, in which.

DETAILED DESCRIPTION OF THE DISCLOSURE

Figure 1:
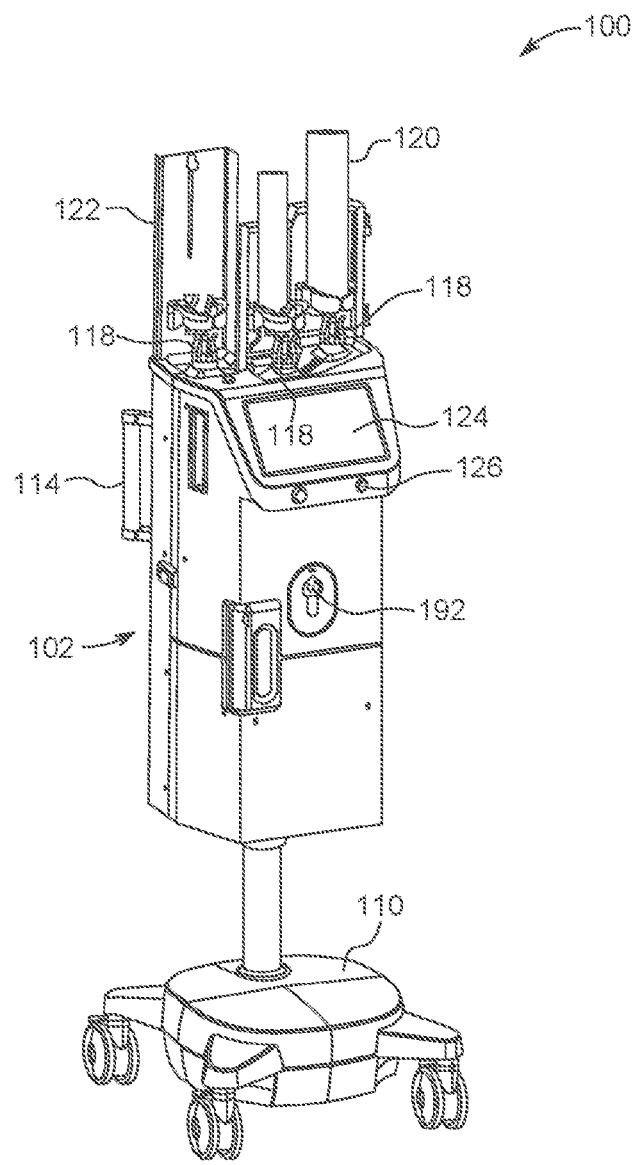
FIG. 1 is a perspective view of a fluid injector system according to one example of the present disclosure.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. When used in relation to a syringe of a multi-patient disposable set, the term "proximal" refers to a portion of a syringe nearest a piston for delivering fluid from a syringe.

Spatial or directional terms, such as "left", "right", "inner", "outer", "above", "below", and the like, are not to be considered as limiting as the invention can assume various alternative orientations.

All numbers used in the specification and claims are to be understood as being modified in all instances by the term "about". The terms "approximately", "about", and "substantially" mean a range of plus or minus ten percent of the stated value.

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

It is also to be understood that the specific devices and processes illustrated in the attached drawings, and described in the following specification, are simply exemplary examples of the disclosure. Hence, specific dimensions and other physical characteristics related to the examples disclosed herein are not to be considered as limiting.

When used in relation to a fluid reservoir, such as a syringe, a rolling diaphragm, or multiple syringe disposable set, the term "distal" refers to a portion of the fluid reservoir nearest to a patient. When used in relation to a fluid reservoir, such as a syringe, a rolling diaphragm, or multiple syringe disposable set, the term "proximal" refers to a portion of the fluid reservoir nearest to the injector system.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "server" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Referring to the drawings in which like reference characters refer to like parts throughout the several views thereof, one aspect or example of the present disclosure is generally directed to a multi-fluid medical injector/injector system 100 (hereinafter "fluid injector system 100") which in certain embodiments may include a multi-use disposable set (MUDS) 130 configured for delivering fluid to a patient using a single-use disposable set (SUDS) connector (not shown), and in other embodiments may include two or more disposable fluid reservoirs or syringes, which may be disposed after one injection procedure or a specific number of injection procedures. The fluid injector system 100 may include multiple components as individually described herein. Generally, the fluid injector system 100 depicted in FIGS. 1-2 has a powered injector or other administration device and a fluid delivery set intended to be associated with the injector to deliver one or more fluids from one or more multi-dose containers under pressure into a patient, as described herein. The various devices, components, and features of the fluid injector system 100 and the fluid delivery set associated therewith are likewise described in detail herein. While the various examples of the methods and processes are shown with reference to an injector system having a multi-use disposable set ("MUDS") and a single-use disposable set ("SUDS") configuration in FIGS. 1-2, the disclosure is not limited to such an injector system and may be utilized in other syringe based injector systems, such as but not limited to those described in U.S. Pat. Nos. 7,553,294, 7,563,249, 8,945,051, 9,173,995, 10,124,110; 10,507,319; and 10,583,256; and U.S. application Ser. No. 15/568,505; the disclosures of each of which are incorporated herein in their entirety by this reference.

With reference to FIG. 1, a fluid injector system 100 according to one example includes an injector housing 102 that encloses the various mechanical drive components, electrical and power components necessary to drive the mechanical drive components, and control components, such as electronic memory and electronic control devices, used to control operation of reciprocally movable pistons (not shown) associated with fluid injector system 100 described herein. Such pistons may be reciprocally operable via electro-mechanical drive components such as a ball screw shaft driven by a motor, voice coil actuator, rack-and-pinion gear drive, linear motor, and the like.

The fluid injector system 100 may include at least one bulk fluid connector 118 for connection with at least one bulk fluid source 120. In some examples, a plurality of bulk fluid connectors 118 may be provided. For example, as shown in the fluid injector embodiment illustrated in FIG. 1, three bulk fluid connectors 118 may be provided in a side-by-side or other arrangement. In some examples, the at least one bulk fluid connector 118 may include a spike configured for removably connecting to the at least one bulk fluid source 120, such as a vial, a bottle, or a bag. The at least one bulk fluid connector 118 may be formed on the multi-use disposable set ("MUDS"), as described herein. The at least one bulk fluid source 120 may be configured for receiving a medical fluid, such as saline, Ringer's lactate, an imaging contrast medium solution, or other medical fluid, for delivery to a patient by a fluid injector system 100.

Figure 2:
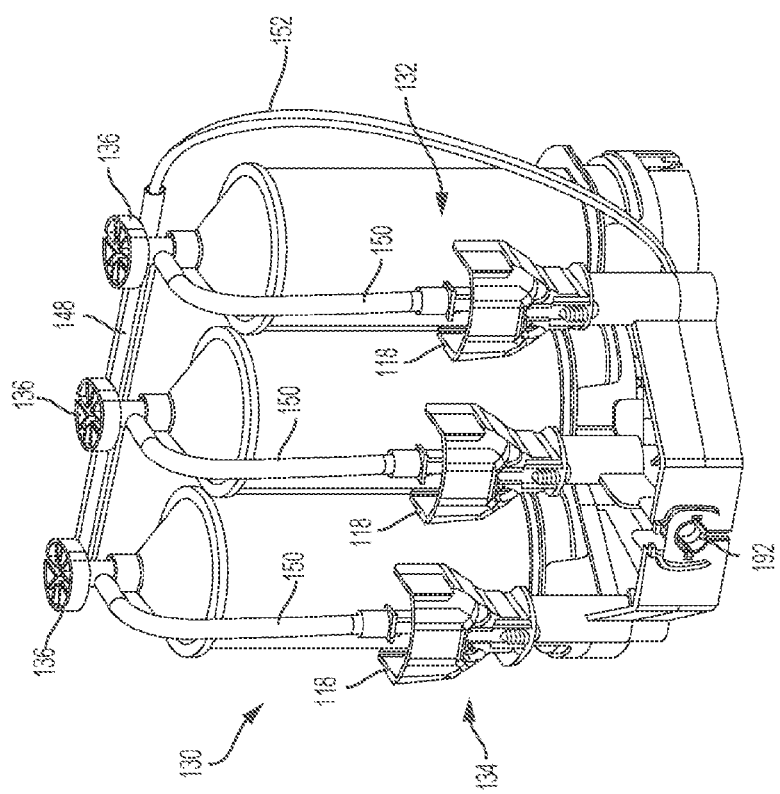
FIG. 2 is a perspective view of a multi-use disposable set for use with a fluid injector system of FIG. 1.

With reference to FIG. 2, a MUDS 130 is configured for being removably connected to the fluid injector system 100 for delivering one or more fluids from the one or more bulk fluid sources 120 to the patient. Examples and features of embodiments of the MUDS are further described in PCT International Publication No. WO 2016/112163, filed on Jan. 7, 2016, the disclosure of which is incorporated herein by reference in its entirety. The MUDS 130 may include one or more fluid reservoirs, such as one or more syringes 132. As used herein, the term "fluid reservoir" means any container capable of taking in and delivering a fluid, for example during a fluid injection procedure including, for example a syringe, a rolling diaphragm, a pump, a compressible bag, and the like. Fluid reservoirs may include the interior volume of at least a portion of a fluid pathway, such as one or more tubing lengths, that are in fluid communication with the interior of the fluid reservoir, including fluid pathway portions that remain in fluid communication with the fluid reservoir after the system is closed or fluidly isolated from the remainder of the fluid pathway. In some examples, the number of fluid reservoirs may correspond to the number of bulk fluid sources 120 (shown in FIG. 1). For example, with reference to FIG. 2, the MUDS 130 has three syringes 132 in a side-by-side arrangement such that each syringe 132 is fluidly connectable to one or more of the corresponding three bulk fluid sources 120. In some examples, one or more bulk fluid sources 120 may be connected to one or more syringes 132 of the MUDS 130. Each syringe 132 may be fluidly connectable to one of the bulk fluid sources 120 by a corresponding bulk fluid connector 118 and an associated MUDS fluid path 134. The MUDS fluid path 134 may have a spike element that connects to the bulk fluid connector 118 and the fluid line 150. In some examples, the bulk fluid connector 118 may be provided directly on the MUDS 130.

With continued reference to FIGS. 1 and 2, the MUDS 130 may include one or more valves 136, such as stopcock valves, for controlling which medical fluid or combinations of medical fluids are withdrawn from the multi-dose bulk fluid source 120 (see FIG. 1) into the fluid reservoirs 132 and/or are delivered to a patient from each fluid reservoir 132. In some examples, the one or more valves 136 may be provided on a distal end of the plurality of syringes 132 or on a manifold 148. The manifold 148 may be in selectable fluid communication via valves 136 with the interior volume of the syringes 132. The interior volume of the syringes 132 may be in selectable fluid communication via valves 136 with a first end of the MUDS fluid path 134 that connects each syringe 132 to the corresponding bulk fluid source 120. The opposing second end of the MUDS fluid path 134 may be connected to the respective bulk fluid connector 118 that is configured for fluidly connecting with the bulk fluid source 120. Depending on the position of the one or more valves 136, fluid may be drawn into the interior volume of the one or more syringes 132 or it may be delivered from the interior volume of the one or more syringes 132. In a first position, such as during the filling of the syringes 132, the one or more valves 136 are oriented such that fluid flows from the bulk fluid source 120 into the desired syringe 132 through a fluid inlet line 150, such as a MUDS fluid path. During the filling procedure, the one or more valves 136 are positioned such that fluid flow through one or more fluid outlet lines 152 or manifold 148 is blocked or closed. In a second position, such as during a fluid delivery procedure, fluid from one or more syringes 132 is delivered to the manifold 148 through the one or more fluid outlet lines 152 or syringe valve outlet ports. During the delivery procedure, the one or more valves 136 are positioned such that fluid flow through one or more fluid inlet lines 150 is blocked or closed. In a third position, the one or more valves 136 are oriented such that fluid flow through the one or more fluid inlet lines 150 and the one or more fluid outlet lines 152 or manifold 148 is blocked or closed. Thus, in the third position, each of the one or more valves 136 isolates the corresponding syringe 132 and prevents fluid flow into and out of the interior volume of the corresponding syringe 132. As such, each of the one or more syringes 132 and the corresponding valves 136 defines a closed system.

The one or more valves 136, fluid inlet lines 150, and/or fluid outlet lines 152 may be integrated into or in fluid communication via the manifold 148. The one or more valves 136 may be selectively positioned to the first or second position by manual or automatic handling. For example, the operator may position the one or more valves 136 into the desired position for filling, fluid delivery, or the closed position. In other examples, at least a portion of the fluid injector system 100 is operable for automatically positioning the one or more valves 136 into a desired position for filling, fluid delivery, or the closed position based on input by the operator or by a protocol executed by the electronic control unit.

With continued reference to FIGS. 1 and 2, according to the described embodiment the fluid injector system 100 may have a connection port 192 that is configured to form a releasable fluid connection with at least a portion of the SUDS. In some examples, the connection port 192 may be formed on the MUDS 130. As described herein, the SUDS may be connected to the connection port 192, formed on at least a portion of the MUDS 130 and/or the housing 102. Desirably, the connection between the SUDS and the connection port 192 is a releasable connection to allow the SUDS to be selectively connected to and disconnected from the connection port 192. In some examples, the SUDS may be disconnected from the connection port 192 and disposed after each fluid delivery procedure, and a new SUDS may be connected to the connection port 192 for a subsequent fluid delivery procedure. The SUDS may be used to deliver one or more medical fluids to a patient by SUDS fluid line 208 having a distal end that may be selectively disconnected from the body of the SUDS and connected to a patient catheter. Other examples and features of the SUDS are described in U.S. Patent Publication No. 2016/0331951, filed Jul. 7, 2016, the disclosure of which is incorporated herein by reference in its entirety.

Referring again to FIG. 1, the fluid injector system 100 may include one or more user interfaces 124, such as a graphical user interface (GUI) display window. The user interface 124 may display information pertinent to a fluid injection procedure involving fluid injector system 100, such as injection status or progress, current flow rate, fluid pressure, and volume remaining in the at least one bulk fluid source 120 connected to the fluid injector system 100 and may be a touch screen GUI that allows an operator to input commands and/or data for operation of fluid injector system 100. Additionally, the fluid injector system 100 and/or user interface 124 may include at least one control button 126 for tactile operation by an attendant operator of the fluid injector system 100. The at least one control button 126 may be a graphical part of the user interface 124, such as a touch screen.

Figure 3:
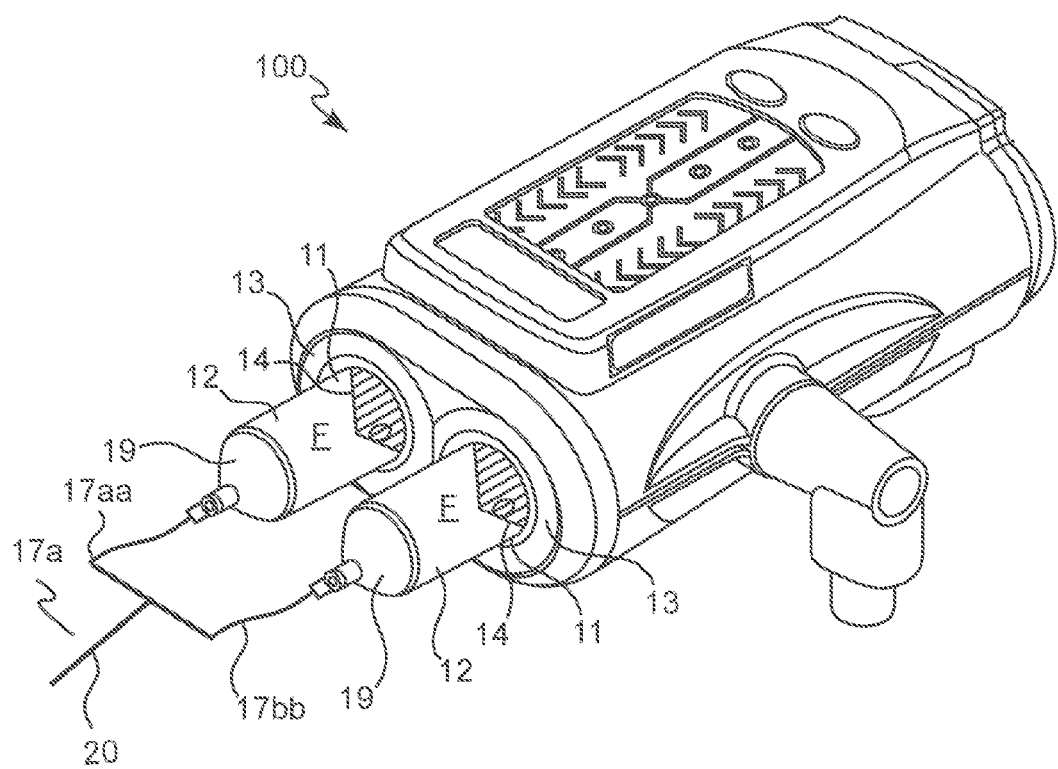
FIG. 3 is a perspective view of a fluid injector system according to another example of the present disclosure.

While FIGS. 1-2 illustrate one example of a fluid injector system 100 and associated components and structure, it is to be understood that the present disclosure is not limited to any particular type or variety of the fluid injector system 100. Referring now to FIG. 3, another non-limiting example of a fluid injector system 100 in accordance with the present disclosure includes at least one fluid reservoir, such as syringe 12, at least one piston (not pictured) connectable to at least one plunger 14, and a fluid control module (not pictured). The at least one syringe 12 is generally adapted to interface with at least one component of the system, such as a syringe port 13. The fluid injector system 100 is generally configured to deliver at least one fluid F to a patient during an injection procedure. The fluid injector system 100 is configured to releasably receive the at least one syringe 12, which is to be filled with at least one fluid F, such as a contrast media, saline solution, Ringer's lactate, or any desired medical fluid. The system may be a multi-syringe injector, wherein several syringes may be oriented side-by-side or in another spatial relationship and are separately actuated by respective pistons associated with the injector. The at least one syringe 12 may be oriented in any manner such as upright, downright, or positioned at any degree angle. In another embodiment, a fluid injector 100 may interface with one or more rolling diaphragm syringes (not shown). Non-limiting examples of rolling diaphragm syringe based injectors are described in U.S. application Ser. Nos. 15/305,285, and 15/568,505 and PCT International Application No. PCT/US2017/056747, the disclosures of which are incorporated herein.

Figure 4:
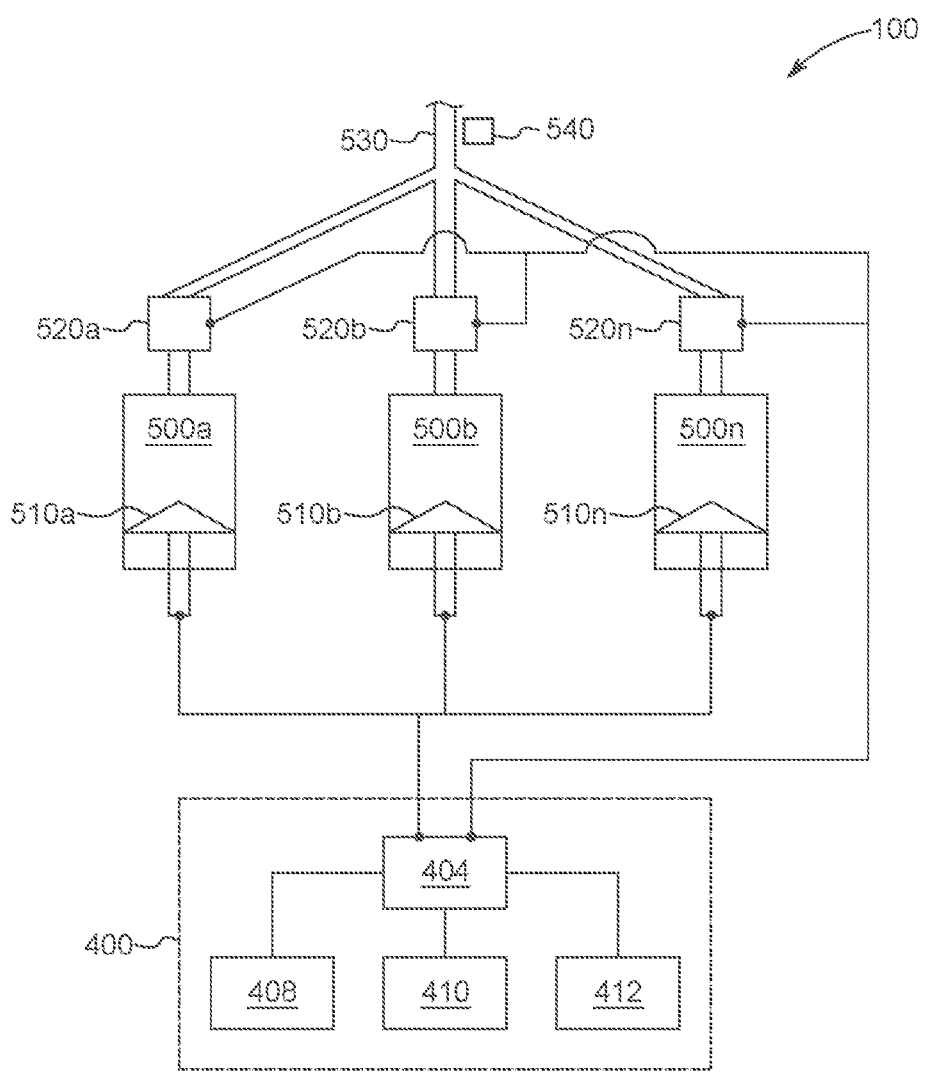
FIG. 4 is a schematic view of an electronic control system of a fluid injector system in accordance with examples of the present disclosure.

With continued reference to FIG. 3, the injector system 100 may be used during a medical procedure to inject the at least one medical fluid F into the vasculature system of a patient by driving a plunger 14 of at least one syringe 12 with a drive member, such as the at least one piston 103 (see FIG. 4). The at least one piston may be reciprocally operable upon at least a portion of the at least one syringe, such as the plunger 14. Upon engagement, the at least one piston may move the plunger 14 toward the distal end 19 of the at least one syringe, as well as retracting the plunger 14 toward the proximal end 11 of the at least one syringe 12.

A tubing set 17 (e.g., first and second fluid conduits 17a and 17b, and common fluid conduit 20) may be in fluid communication with an outlet port of each syringe 12 to place each syringe in fluid communication with a catheter for delivering the fluid F from each syringes 12 to the catheter (not shown) inserted into a patient at a vascular access site. The first and second fluid conduits 17a and 17b may be connected to the common fluid conduit 20 by any suitable mechanism known in the art (e.g., a Y-connector or a T-connector). The fluid injector system 100 shown in FIG. 3 is an open system due to the lack of valves capable of isolating the syringes 12 from one another and from at least a portion of the tubing set 17. However, it is to be understood that valves, similar or identical to the valves 136 described with reference to the fluid injector system 100 of FIGS. 1 and 2, may be added distally of the syringes 12 to convert the fluid injector system 100 of FIG. 3 to a closed system.

Referring now to FIG. 4, fluid injector systems 100 in accordance with the present disclosure may be associated with and controlled by an electronic control device 400 configured to execute one or more injector protocols including, for example, the filling, priming, and delivery operations. In some examples, the electronic control device 400 may control the operation of various valves, stopcocks, piston members, and other elements to affect a desired gas/air removal, filling, and/or delivery procedure. The electronic control device 400 may include at least one processor 404, memory 408, an input component 410, and an output component 412. The electronic control device further may include a bus that permits communication among the components of electronic control device 400. The at least one processor 404 may be implemented in hardware, firmware, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 408 may include a hard disk (e.g., a magnetic disk, an optical disk, a magneto-optic disk, a solid-state disk, etc.) and/or another type of computer-readable medium. The input component 410 may include a component that permits the electronic control device 400 to receive information, such as via user input (e.g., the user interface 124). The output component 412 may include a component that provides output information from the electronic control device 400 (e.g., the user interface 124).

The electronic control device 400 may be programmed or configured to perform one or more processes and/or methods based on the at least one processor 404 executing software instructions stored by a computer-readable medium, such as memory 408. When executed, software instructions stored in memory 408 may cause the at least one processor 404 to perform one or more processes and/or methods described herein.

With continued reference to FIG. 4, the electronic control device 400, more particularly the at least one processor 404, may be in operative communication with one or more components of the fluid injector system 100 to control an operation of the fluid injector system 100. The electronic control device 400 may be in operative communication with one or more drive components 510a, 510b, 510n respectively associated with one or more fluid reservoirs 500a, 500b, 500n of the fluid injector system 100 to control filling of fluid and delivery of fluid from the fluid reservoirs 500a, 500b, 500n. More particularly, each of the one or more drive components 510a, 510b, 510n may be associated with one of the fluid reservoirs 500a, 500b, 500n such that fluid contained in each of the fluid reservoirs 500a, 500b, 500n may be selectively delivered via actuation of the associated drive component 510a, 510b, 510n. The fluid reservoirs 500a, 500b, 500n may be, or may correspond to, the syringes 132 of the fluid injector system 100 of FIGS. 1-2 and/or the syringes 12 of the fluid injector system 100 of FIG. 3 or other syringe-type structures, such as rolling diaphragm syringes, as described herein. The one or more drive components 510a, 510b, 510n may be, or may correspond to, the pistons (not pictured) of the fluid injector systems 100 of FIGS. 1-3. The one or more fluid reservoirs 500a, 500b, 500n may be in fluid communication with a fluid conduit 530 for delivering fluid to a catheter or other component connected to a patient. The fluid conduit 530 may be, or may correspond to, the SUDS of the fluid injector system 100 of FIGS. 1-2 and/or tubing set 17 of the fluid injector system 100 of FIG. 3

In aspects and examples of a closed fluid injector system 100 (e.g., the fluid injector system 100 of FIGS. 1 and 2), the electronic control device 400 further may be in operative communication with one or more valves 520a, 520b, 520n in order to rotate or otherwise actuate the valves 520a, 520b, 520n to direct flow into or out of and/or isolate flow from one or more of the fluid reservoirs 500a, 500b, 500n to the fluid conduit 530. The valves 520a, 520b, 520n may be, or may correspond to, the valves 136 described herein in connection with FIG. 2.

During a fluid injection procedure by the fluid injector system 100, a load is applied to the system by way of, e.g., one or more drive components 510a, 510b, 510n, and the resulting change in fluid pressure within each of the fluid reservoirs (i.e., fluid reservoirs 500a, 500b, 500n) may cause the system to store some elastic energy in the form of increased internal volume (i.e., swelling) of the fluid reservoirs 500a, 500b, 500n, elastic mechanical deflection of, e.g., the plungers coupled to each drive component, etc. This pressure-dependent increase in volume is known as the change in compliance volume of the system. Based on known characteristics of each fluid reservoir 500a, 500b, 500n and the fluid injector system 100 as a whole, a measured change of fluid pressure within the system allows for a corresponding change in compliance volume to be calculated. In one embodiment, change in compliance volume may be determined via a global equation executed by, e.g., the at least one processor 404 using information regarding changes in fluid pressure, fluid flow rate, etc. In another embodiment, the compliance volume may be determined through the use of one or more sensors capable of measuring, e.g., expansion, deflection, etc. of the various components of the system. In still another embodiment, the change in compliance volume of a specific component (e.g., a certain size/model of fluid reservoir) may be predetermined, and the component may include a scannable bar code or other indicator that provides the compliance volume characteristics of the component under various pressure and flow rate conditions. It is to be understood that other methods of determining compliance volume are also possible.

Due to the compliance of the system based on changes in internal pressure during fluid injection procedures, the actual flow rate out of the system may be lower than the directed/commanded flow rate controlled by, e.g., each associated drive component 510a, 510b, 510n due to losses caused by increased internal volume and/or elastic mechanical deflection. However, in accordance with aspects of the present disclosure, the seemingly undesirable compliance characteristics of the system may actually be utilized to rapidly detect an occlusion at a location in-line between the powered fluid injector system and the injection site, as will be set forth in further detail below.

As is known in the art, occlusions are disturbances in the fluid flow path that cause a rise in pressure by decreasing flow out of the system. An occlusion may occur at any location between the fluid injector system and the injection site for a variety of reasons such as, e.g., a tubing kink, a catheter pointed at the wall of a vein, a catheter tip pressed into an anatomic valve within a blood vessel, etc. When an occlusion occurs, the fluid pressure increases significantly at the occlusion site, which is particularly undesirable if the occlusion site is located at or near the injection site (i.e., a patient catheter). Accordingly, rapid identification of, and response to, a detected occlusion is desired. While current fluid injector systems do implement pressure limits in an attempt to avoid undesirable overshoots in pressure, those pressure limits are applicable to the fluid injector system itself, which may see much higher pressures than the injection site during normal (i.e., unobstructed) operation. However, when a complete occlusion occurs, the pressure seen in the occlusion site is substantially equal to the pressure seen at the fluid injector system. Thus, by the time that the fluid injector system reaches its predetermined pressure limit and fluid flow reductions or other safety protocols are implemented, the occlusion site may be subjected to undesirable pressure increases.

A method of occlusion detection in accordance with an embodiment of the disclosure will be described below based on an example scenario, but it is to be understood that the invention is not limited to the settings and values described with respect to this example.

In the example scenario, a drive component (e.g., a piston) may be controlled to be driven forward so as to generate a fluid flow rate of 2 mL/s. As the drive component is driven forward through a fluid reservoir, the fluid injector system 100 is configured to continuously monitor changes in pressure within the system at given time intervals. For example, as the drive component is at the 150 mL location of the fluid reservoir, a pressure of 50 psi is measured at a first time (T=0 s). The system is then configured to determine a pressure at a second time (T=1 s) to identify any changes in pressure. In the example scenario, the pressure at the second time (T=1 s) is measured as 110 psi, thereby representing a 60 psi increase in pressure over the one second interval.

As detailed above, an increase in fluid pressure within the system leads to increased internal volume and/or elastic mechanical deflection of various components, which may be characterized as a compliance volume. In the example above, wherein a 60 psi increase in pressure was realized over a one second interval at the 150 mL location of the fluid reservoir, the increased compliance volume of the system is calculated to be 2 mL. That is, there is a 2 mL "loss" in the system due to increased internal volume and/or elastic mechanical deflection under pressure. As was previously noted, the specifics of the equation or other method of determining compliance volume may vary depending upon system properties.

With the 2 mL compliance volume under a pressure spike of 60 psi at time T=1 s, the true flow rate out of the fluid reservoir correspondingly decreases. However, as the fluid flow rate in the example above was 2 mL/s, the determined compliance volume of 2 mL at time T=1 s means that the true fluid flow out of the system is null (or zero) at time T=1 s. For there to be zero fluid flow out of the system, yet a measured fluid pressure of 110 psi, a complete occlusion must have occurred downstream. As such, in accordance with aspects of the present disclosure, the compliance volume of the system can be continuously calculated at various time intervals during an injection procedure so as to detect possible occlusions in real time, thereby helping to avoid undesirable pressure increases at the site of the occlusion.

Figure 5:
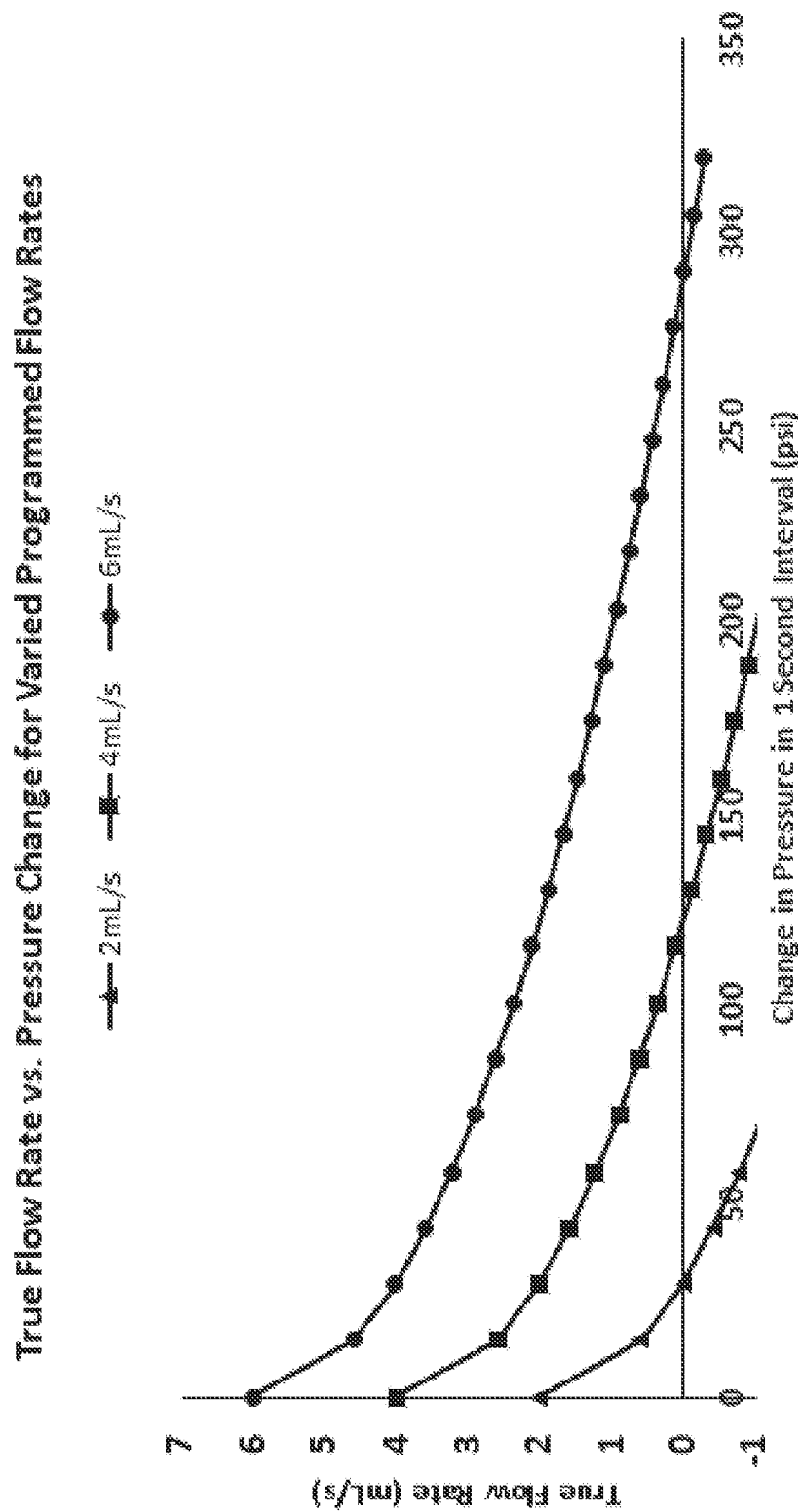
FIG. 5 is a graphical representation of compliance volume of a fluid injector system under varying fluid flow rates and pressure changes in accordance with examples of the present disclosure.

Referring to FIG. 5, an example graph for use in conjunction with an occlusion detection method described above is illustrated. Using a calculated compliance volume, the system may be configured to simply monitor for pressure changes over a given time interval and based on the equation(s) used to determine compliance volume, thresholds of acceptable pressure change over the given time interval may be determined. For example, the graph in FIG. 5 illustrates the compliance volume equation for a system having prescribed fluid flow rates of 2 mL/s, 4 mL/s, and 6 mL/s, respectively. Referring to the 2 mL/s line on the graph, at time T=0 s, the true flow rate is shown as 2 mL/s.

However, as increases in fluid pressure are measured during the one second time interval, the true flow rate out of the system correspondingly decreases due to the increased compliance volume of the system, eventually reaching a true flow rate of 0 mL/s if and when a 60 psi pressure increase is realized over the one second interval. As outlined in the above example, only a complete occlusion would cause such a "zero flow" scenario. Similarly, when the prescribed fluid flow rate is 4 mL/s, the threshold (that is, true flow rate=0 mL/s) is reached when a pressure increase of 150 psi is realized over the one second interval, while for a fluid flow rate of 6 mL/s, the threshold is reached when a pressure increase of 300 psi is reached over the one second interval. It is to be understood that these flow rate and pressure values are merely used for purposes of this example, and different flow rates, pressure values, and thresholds may be present depending on the system configurations.

While the above examples utilize a time interval of one second for the purposes of simplified illustration, it is to be understood that actual implementations of the method may determine pressure differentials calculated over much shorter intervals (e.g., 100-200 ms), thereby ensuring a rapid detection (and response) to any potential occlusions.

Accordingly, in utilizing the compliance volume equation, the system need only monitor pressure changes over a given time interval in order to detect occlusions. In one embodiment, if an occlusion is detected, the system can then trigger a reduction in fluid flow so as to adequately reduce the pressure at the occlusion site. In another embodiment, the system may trigger an alarm or other safety protocol when an occlusion is detected.

Additionally and/or alternatively, while the threshold described above pertains to a point at which the true flow rate out of the system equals 0 mL/s (i.e., a complete occlusion), in other embodiments, the threshold of reduced true flow rate may be a number greater than zero when the reduction in fluid flow and/or other safety protocol is implemented. For example, the system may trigger a reduction in fluid flow if the true flow rate out of the system falls to less than 30% of the prescribed flow rate during the given time interval, as such a reduction likely points to at least a partial blockage or other impediment in the system that may cause undesirable pressure increases at or near the injection site. By implementing the reduction in fluid flow prior to reaching a true flow rate of zero, it may be possible for the injection procedure to continue at a reduced flow rate until the occlusion or partial blockage of flow is remedied.

Next, in accordance with another aspect of the disclosure, the same logic utilized above with respect to occlusion detection may also be used to optimize pressure limiting of the fluid injector system.

As noted above, fluid injector systems may be subject to a predetermined pressure limit. The predetermined pressure limit may be based on a variety of factors such as procedure type, patient age, etc. Typically, when a fluid injector system reaches a predetermined pressure limit, the fluid flow rate is abruptly stepped down so as to reduce the pressure below the pressure limit. The fluid flow rate may then be increased again in order to return the flow to a desired rate, with the flow rate repeatedly being stepped down in the event that the pressure limit is again reached. However, these continuous changes in fluid flow rate results in numerous motor speed changes in the system, which effects the overall life of the motor, and may result in poor volume accuracy performance. Additionally, the needed reduction in fluid flow rate is often overestimated, resulting in too low of a fluid flow rate, which may adversely impact the injection procedure.

Utilizing the logic described above, the calculated change in compliance volume of the system may be used to optimize system performance when a predetermined pressure limit is reached. Specifically, in accordance with an aspect of the disclosure, the electronic control device (e.g., electronic control device 400) may be configured to monitor for the moment when a predetermined pressure limit is reached. At that moment, the processor of the electronic control device (e.g., processor 404) may be configured to query a change in fluid pressure over a final time period immediately prior to the predetermined pressure limit being reached. In one example, the time period may be the last one second interval prior to the predetermined pressure limit being reached. However, in actual implementations, the time period is likely to be much shorter than one second (e.g., 250 milliseconds).

Using the pressure differential determined in this last time interval, a change in compliance volume of the system can be calculated using any of the methods described above. Determining the compliance volume based on the pressure differential immediately preceding the predetermined pressure limit is optimal, as the system components will see no higher fluid pressures than at that moment, so the change in compliance volume will be at its maximum for the prescribed injection procedure.

Next, using the determined change in compliance volume, the processor may then be configured to subtract the change in compliance volume from the directed fluid flow rate so as to determine a true flow rate out of the system. In one example, referring again to FIG. 5, if the commanded fluid flow rate is 4 mL/s, and the pressure differential measured in the last one second interval prior to reaching the predetermined pressure limit is 60 psi, then the compliance volume of the system is calculated to be approximately 2 mL. Thus, to determine the true flow rate out of the system at this time, the compliance volume is subtracted from the volumetric component of the directed fluid flow rate (i.e., 4 mL minus 2 mL equals a true fluid flow rate of 2 mL/s at the time the predetermined pressure limit is reached). It is to be understood that the time interval during which the pressure differential is measured may be any predetermined time interval. The time interval chosen may be based on the processing capabilities of the system, and may be less than one second (i.e., milliseconds). The use of a one second interval in the example scenarios herein is merely for simplicity of explanation, and it is to be understood that the time intervals described herein are not to be considered limiting.

Utilizing the calculated true fluid flow rate at this time, the processor may then be configured to update the commanded fluid flow rate of the drive component (e.g., the piston) to match the true fluid flow rate. By reducing the fluid flow rate in this way, the pressure should stabilize near the predetermined pressure limit. If the initial reduction in fluid flow rate does not stem the pressure rise (i.e., the predetermined pressure limit is again reached), the system can be configured to continue to step down the fluid flow rate by measuring the pressure increases over a given time interval and determining a recursive update to the fluid flow rate using the same method as described above with respect to the initial flow rate reduction.

With the above method of flow rate reduction using a calculated change in compliance volume, the pressure limiting performance of the system should improve significantly, as the number of motor speed changes will be greatly reduced as compared to conventional pressure limiting methods. Such a reduction in motor speed changes improves the pressure accuracy under the predetermined pressure limit, as current fluctuations from motor speed changes are reduced, thereby leading to better volume accuracy performance and improved motor life.

Figure 6:
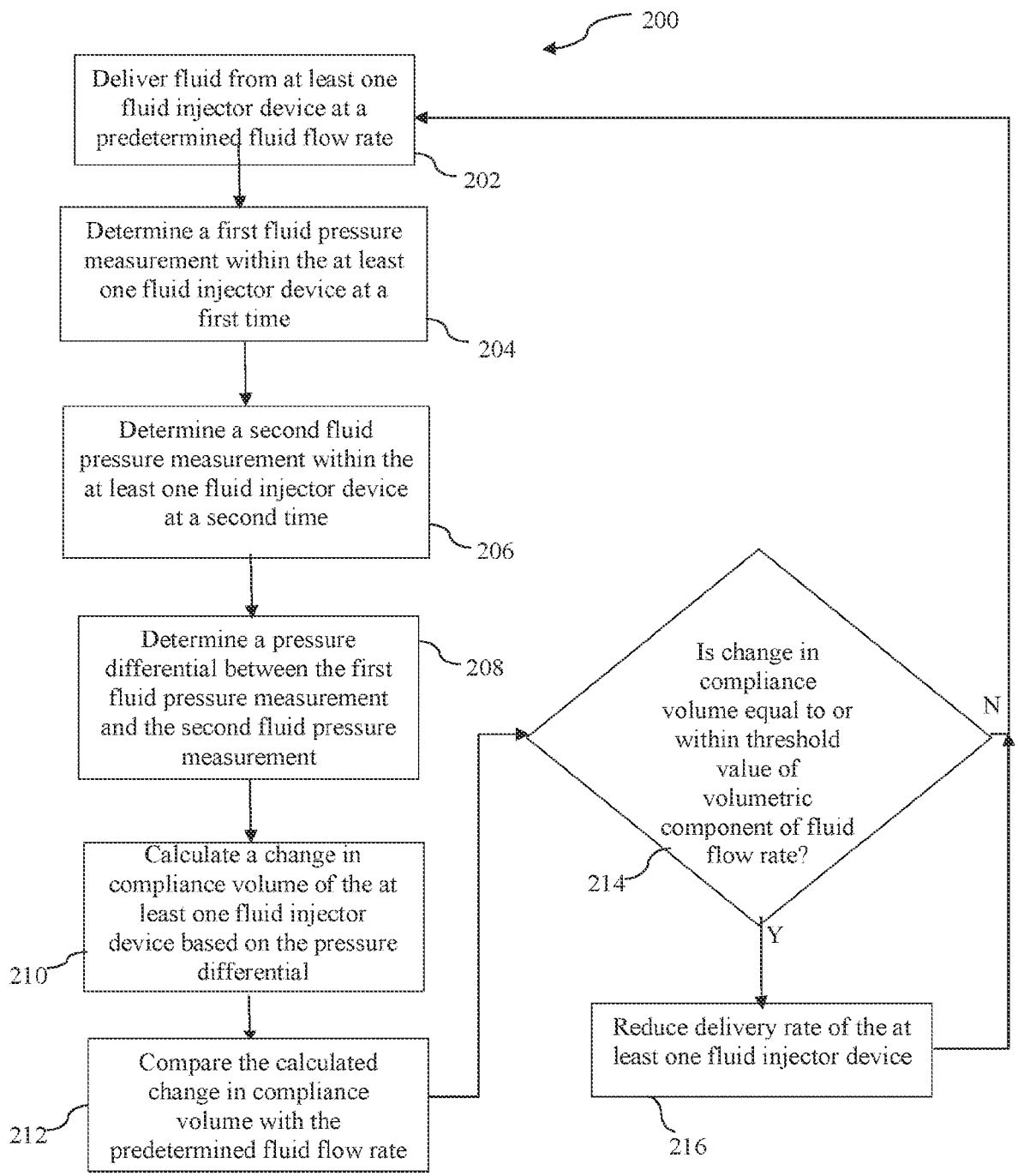
FIG. 6 is a flow chart representing a method in accordance with an aspect of the present disclosure.

Next, referring to FIG. 6, a method 200 in accordance with an aspect of the disclosure is illustrated. First, at 202, fluid is delivered from at least one fluid injector device at a predetermined (i.e., commanded) fluid flow rate. The at least one fluid injector device may be one or more of, e.g., a syringe, a compressible bag, a peristaltic pump, a tubing set, etc. At 204, a first fluid pressure measurement within the at least one fluid injector device is determined at a first time. Then, at 206, a second fluid pressure measurement within the at least one fluid injector device is determined at a second time.

Next, at 208, a pressure differential between the determined first fluid pressure measurement and the second fluid pressure measurement is determined. Using the determined pressure differential, at 210, a change in compliance volume of the at least one fluid injector device is calculated. Then, at 212, the calculated change in compliance volume is compared with the predetermined flow rate.

At 214, it is determined whether or not the calculated change in compliance volume is equal to or within a predetermined threshold value of the volumetric component of the predetermined fluid flow rate. If no, the method returns to 202, and the fluid continues to be delivered at the predetermined fluid flow rate. However, if yes, at 216, the fluid delivery rate is of the at least one fluid injector device is reduced. The method then returns to 202, and the fluid is delivered at the predetermined (and now reduced) fluid flow rate.

While the above-described method utilizes pressure measurements and calculated changes in compliance volume in order to detect occlusions (and/or potential occlusions), it is to be understood that the present disclosure is not limited as such. For example, in other embodiments described in further detail below, the system may rely on a calculated actual flow rate out of the at least one fluid injector device so as to determine whether or not an occlusion has or may occur.

Figure 7:
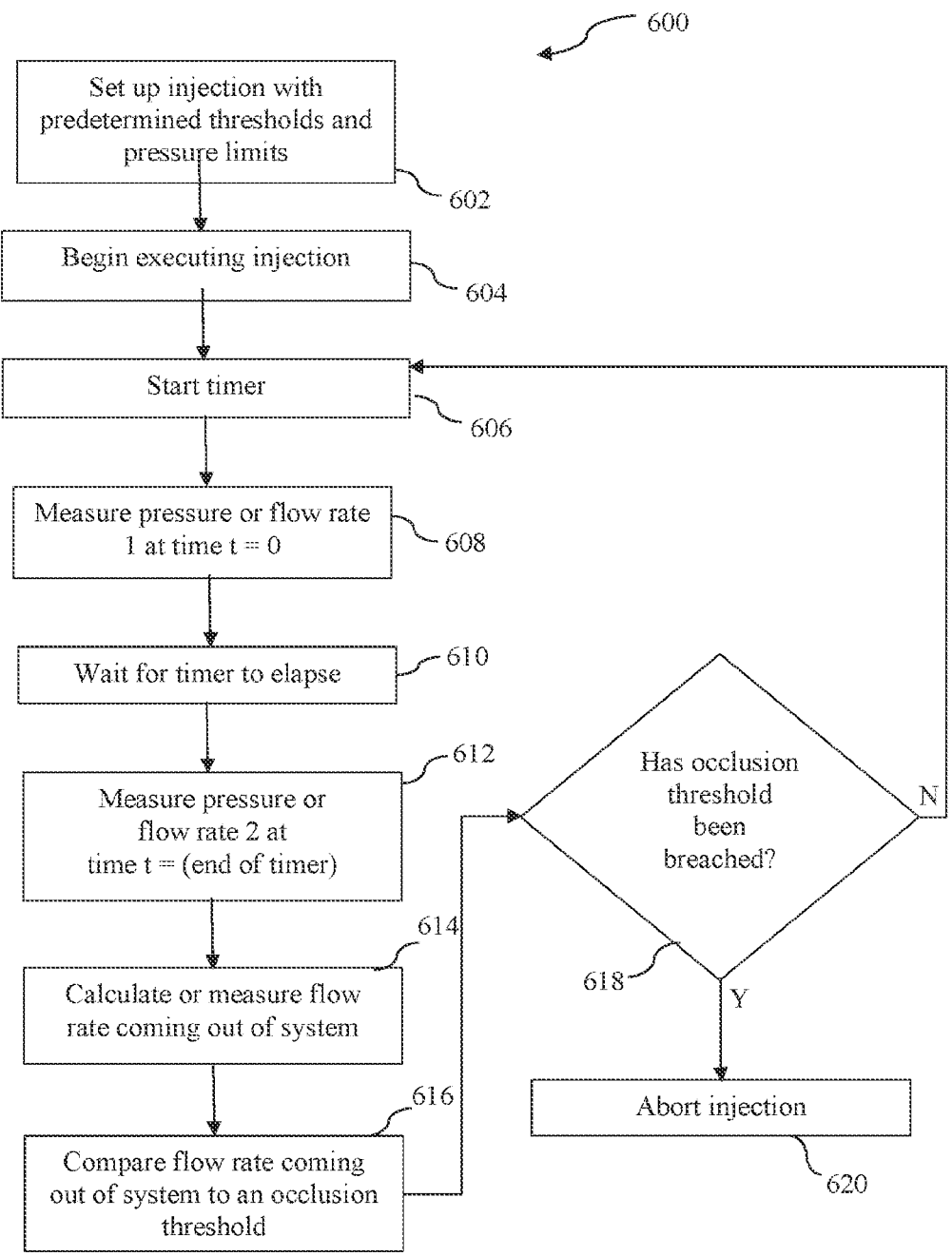
FIG. 7 is a flow chart representing a method in accordance with another aspect of the present disclosure.

Referring to FIG. 7, a method 600 in accordance with another aspect of the disclosure is shown. First, at 602, an injection procedure is set up with predetermined thresholds and pressure limits. The predetermined thresholds may be, e.g., occlusion thresholds based on expected pressures and/or flow rates coming from the system during an injection procedure.

At 604, an injection procedure begins, and at 606, a timer is started. At the moment the timer is started (time t=0), the pressure or actual fluid flow rate is measured at 608. At 610, the system waits for the timer to elapse. It is to be understood that the timer may be set to any predetermined time. Then, at 612, the pressure or actual fluid flow rate is measured at moment the timer has elapsed (time t=(end of timer)).

Next, at 614, using the measured pressure or flow rate at the two separate times, the at least one processor of the system may be configured to calculate or measure the actual flow rate coming out of the system. This actual flow rate is then compared to an occlusion threshold at 616. The occlusion threshold may be, e.g., an expected flow rate range for the system under normal operating conditions. If the actual flow rate is at or below the occlusion threshold, it may be an indication that an occlusion has occurred or may occur.

At 618, a determination is made as to whether the occlusion threshold has been breached. If no, then the method may return to 606, and a new timer may be set to continue to monitor/measure the pressure or flow rate of the system during an injection procedure. However, if yes (i.e., the occlusion threshold has been breached), then the at least one processor may be configured to instruct the fluid injection system to abort the injection at 620.

In addition to occlusion detection, in accordance with another embodiment, the system may utilize an actual flow rate measurement/calculation in order to provide for enhanced pressure limiting. An example flowchart of a method of providing such enhanced pressure limiting is set forth in FIG. 8.

Figure 8:
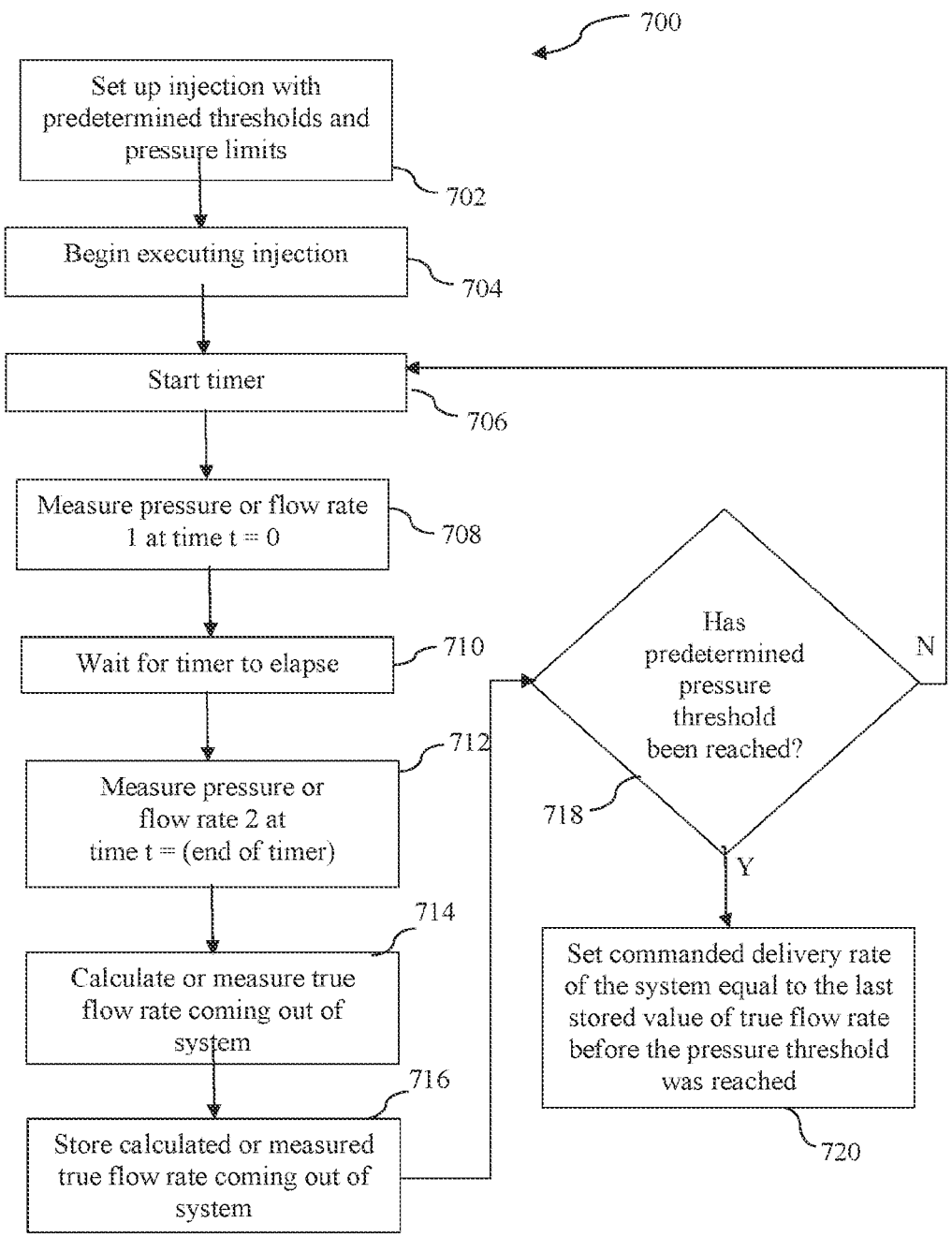
FIG. 8 is a flow chart representing a method in accordance with another aspect of the present disclosure.

Referring to FIG. 8, a method 700 in accordance with another aspect of the disclosure is shown. First, at 702, an injection procedure is set up with predetermined thresholds and pressure limits. The predetermined thresholds may be, e.g., pressure thresholds based on expected pressures levels in the system during an injection procedure.

At 704, an injection procedure begins, and at 706, a timer is started. At the moment the timer is started (time t=0), the pressure or actual fluid flow rate is measured at 708. At 710, the system waits for the timer to elapse. It is to be understood that the timer may be set to any predetermined time. Then, at 712, the pressure or actual fluid flow rate is measured at moment the timer has elapsed (time t=(end of timer)).

Next, at 714, using the measured pressure or flow rate at the two separate times, the at least one processor of the system may be configured to calculate or measure the actual flow rate coming out of the system. At 716, this calculated or measured actual (or true) flow rate coming out of the system is then stored in, for example, a memory of the system.

At 718, a determination is made as to whether a predetermined pressure threshold has been reached. If no, then the method may return to 706, and a new timer may be set to continue to monitor/measure the pressure or flow rate of the system during an injection procedure. However, if yes (i.e., the predetermined pressure threshold has been reached), then at 720, the at least one processor may be configured to instruct the fluid injection system set the commanded fluid delivery rate of the system to the last stored actual (or true) flow rate value before the pressure threshold was reached. In this way, the pressure limiting performance of the system may improve significantly.

Referring now to FIGS. 9-12, various graphical comparisons of injection procedures under different operating conditions are shown.

Figure 9:
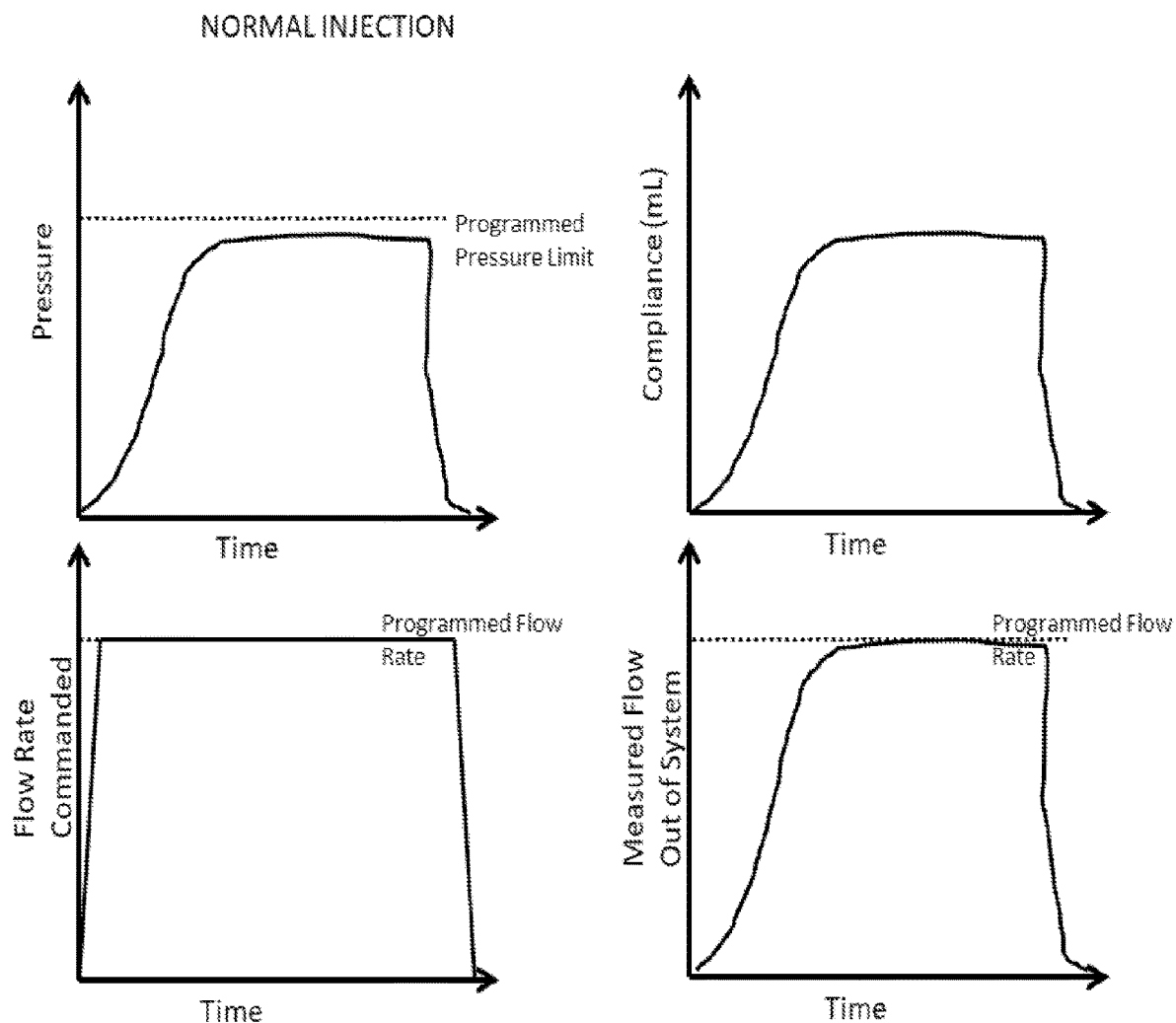
FIG. 9 is a graphical representation of various programmed or measured aspects of the fluid injector system during an injection procedure in accordance with one example of the present disclosure.

Referring first to FIG. 9, graphical representations of pressure vs. time, commanded/programmed flow rate vs. time, change in compliance volume vs. time, and measured flow out of the system vs. time are shown for an injection procedure under normal (i.e., unobstructed) operating conditions. As shown when comparing the pressure vs. time and flow rate vs. time graphs, the pressure within the system rises as the flow rate rises to reach the programmed flow rate. However, the pressure stabilizes before reaching the programmed pressure limit, indicating that the fluid flow out of the system is relatively unobstructed (i.e., normal operating conditions). Additionally, the change in compliance volume follows a substantially similar curve as the pressure curve, which is to be expected during normal operating conditions, and the measured actual flow rate out of the system is substantially similar to the programmed flow rate, with slight variations due in part to the change in compliance volume of the system.

Figure 10:
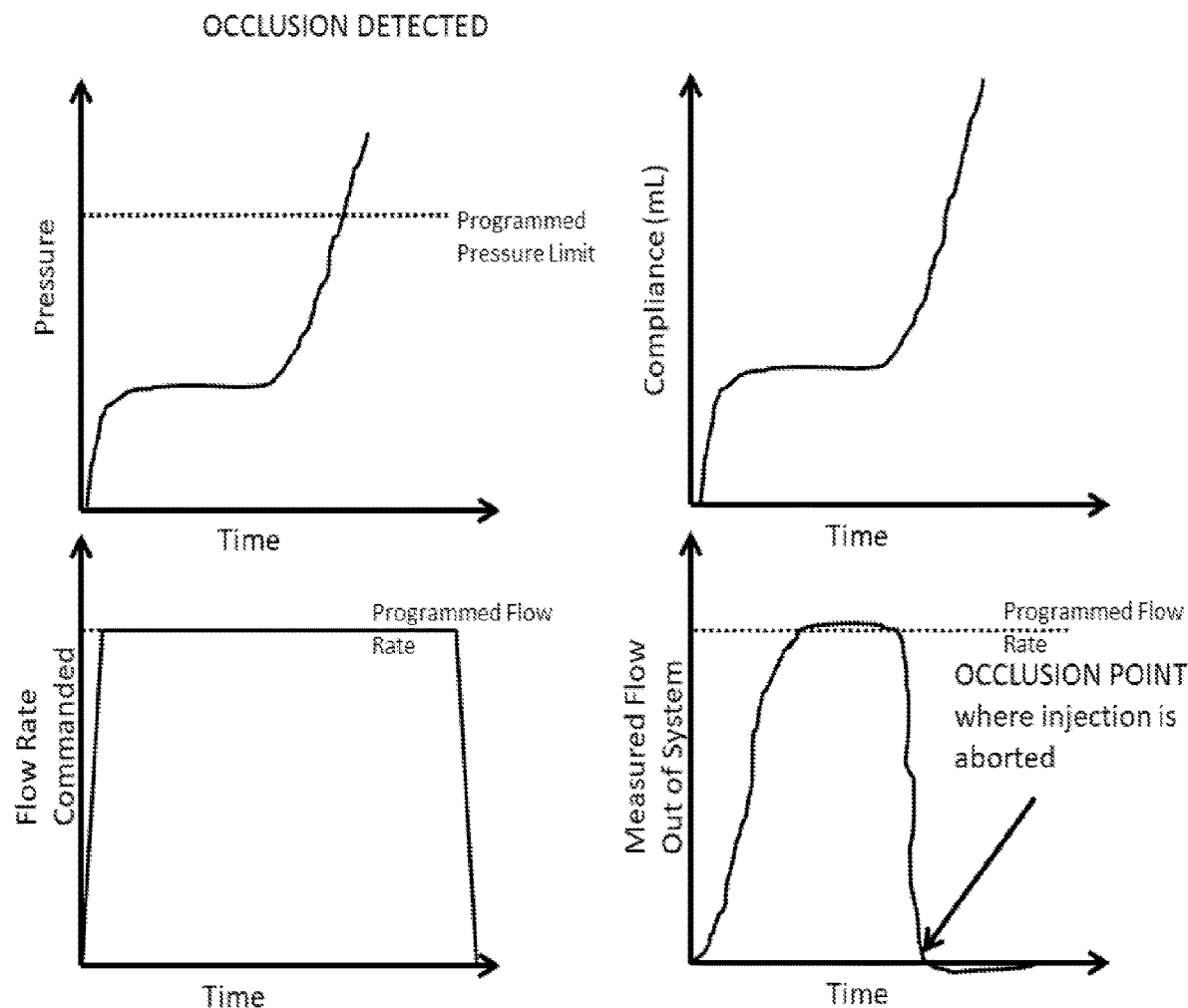
FIG. 10 is a graphical representation of various programmed or measured aspects of the fluid injector system during an injection procedure in accordance with another example of the present disclosure.

Conversely, referring to FIG. 10, graphical representations of an injection procedure in which an occlusion occurs (or is detected) are shown. Once again comparing the pressure vs. time and flow rate vs. time graphs, the pressure rises as the flow rate increases to the programmed flow rate. However, unlike the normal (i.e., unobstructed) described above, in FIG. 10, the pressure gradually increases while the programmed flow rate remains constant, with the pressure eventually reaching and surpassing the programmed pressure limit. The change in compliance volume curve follows the pressure curve, as the increasing pressure leads to a corresponding change in compliance volume. Under these conditions, it can be surmised that an occlusion has occurred. Thus, as described above, when an occlusion (or potential occlusion) is detected, the system may be configured to abort the injection procedure. This scenario can be seen in the measured flow rate vs. time graph, which illustrates that the measured (i.e., actual) flow rate out of the system falls to zero when an occlusion occurs, at which point the injection may be aborted so as to prevent further pressure increases at the occlusion site.

Figure 11:
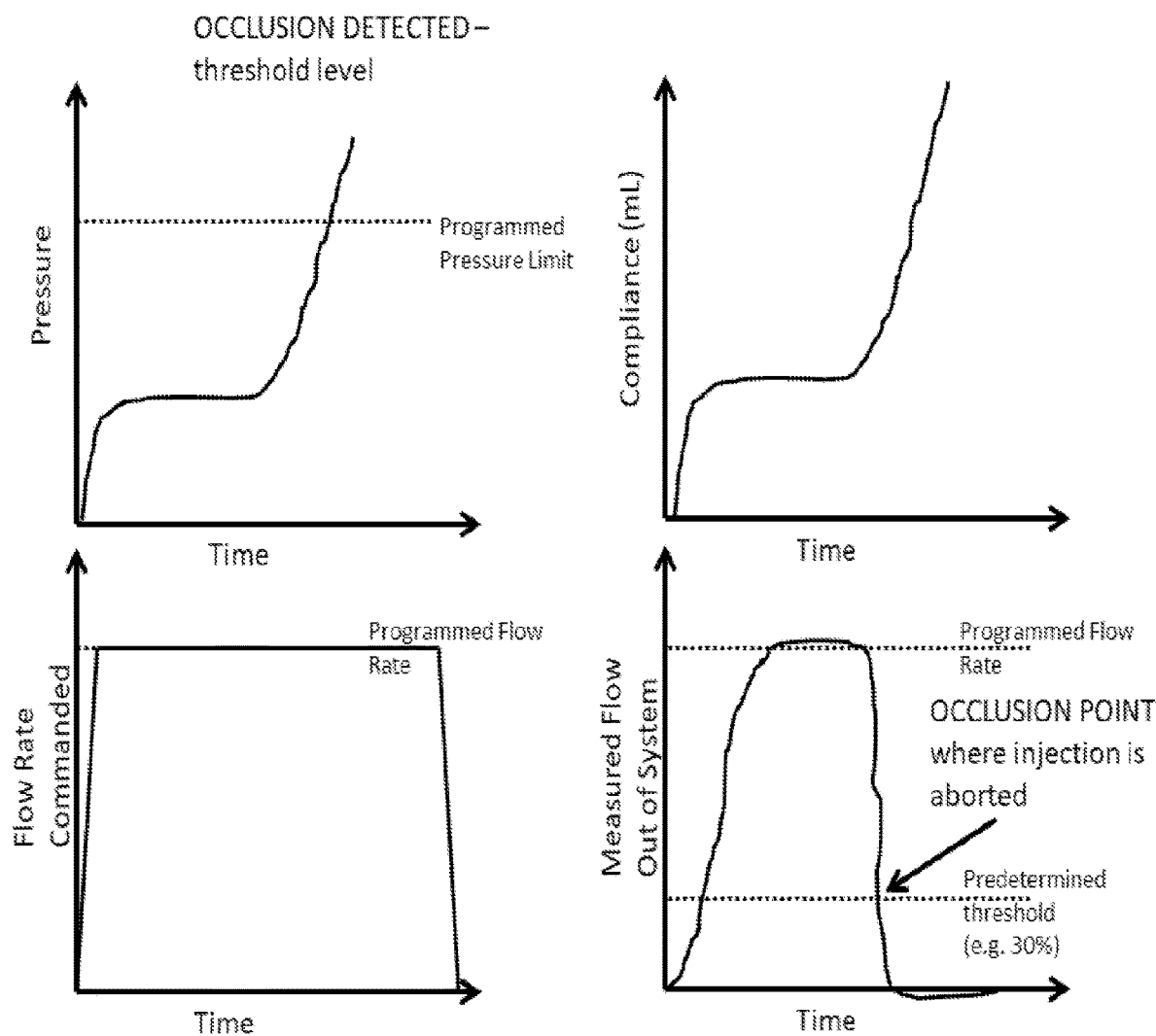
FIG. 11 is a graphical representation of various programmed or measured aspects of the fluid injector system during an injection procedure in accordance with another example of the present disclosure.

Referring now to FIG. 11, graphical representations of an injection procedure in which an occlusion occurs (or is detected) are shown in accordance with another embodiment of the disclosure. Similar to that which is shown and described with respect to FIG. 10, the pressure in the system rises as the flow rate increases to the programmed flow rate. However, due to the occlusion, the pressure gradually increases while the programmed flow rate remains constant, with the pressure eventually reaching and surpassing the programmed pressure limit. However, unlike the scenario shown in FIG. 10, when the occlusion (or potential occlusion) is detected, the system may be configured to abort the injection procedure before the measured (i.e., actual) flow rate out of the system reaches zero. More specifically, there may be a predetermined occlusion threshold (e.g., 30% of the programmed flow rate) at which the system is configured to abort the injection procedure. It may be desirable to abort the injection prior to the actual flow rate out of the system reaching zero so as to avoid potentially undesirable pressure spikes at the location of the occlusion.

Figure 12:
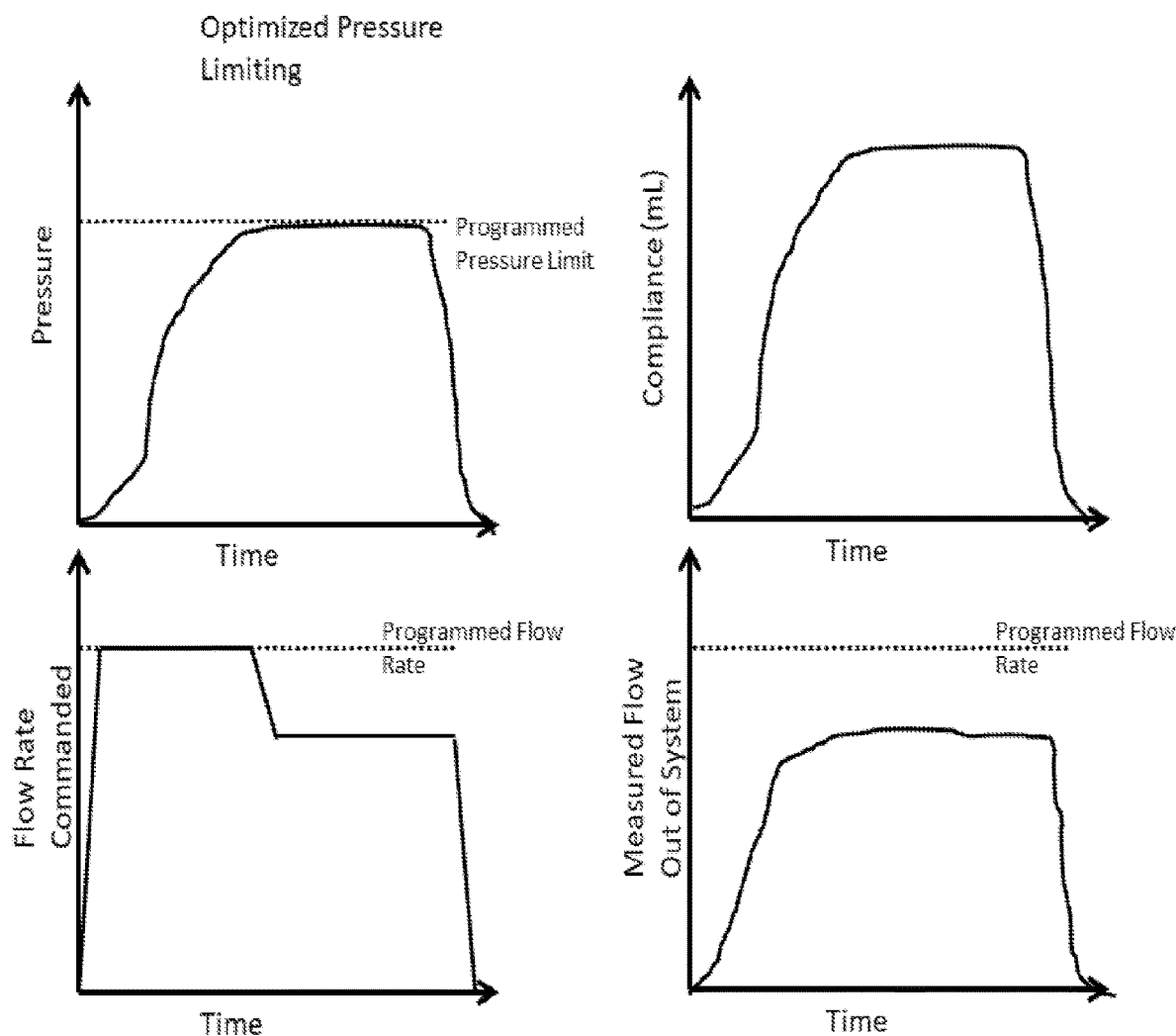
FIG. 12 is a graphical representation of various programmed or measured aspects of the fluid injector system during an injection procedure in accordance with one example of the present disclosure.

Next, referring to FIG. 12, graphical representations of an injection procedure in accordance with another embodiment of the disclosure are shown. Specifically, the graphical representations illustrate an injection procedure in which an optimized pressure limiting method such as that described above is utilized. Comparing the pressure vs. time graph with the programmed/commanded flow rate vs. time graph, it can be seen that the system pressure rises as the flow rate reaches the programmed flow rate. However, referring to the measured (i.e., actual) flow rate vs. time graph, it is readily apparent that the actual flow rate out of the system is lower than the programmed flow rate. This discrepancy may be due at least in part to the change in compliance volume of the system when under pressure, as described above. As such, in accordance with one aspect of the disclosure, in order to mitigate any additional pressure increases, the system may be configured to reduce the programmed flow rate to be substantially equal to the measured flow rate, which may act to stabilize the pressure during the injection procedure.

Although the disclosure has been described in detail for the purpose of illustration based on what is currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

I claim:

1. A fluid injector system configured for use in administering at least one fluid in a fluid injection procedure, the fluid injector system comprising:
    at least one fluid injector device having at least one piston to administer the at least one fluid;
    one or more drive components; and
    a control device comprising at least one processor programmed or configured to:
        provide instructions to the fluid injector system to deliver the at least one fluid from the at least one fluid injector device at a predetermined fluid flow rate,
        determine a first fluid pressure measurement within the at least one fluid injector device at a first time,
        determine a second fluid pressure measurement within the at least one fluid injector at a second time,
        determine a pressure differential between the first fluid pressure measurement and the second fluid pressure measurement,
        calculate a change in compliance volume of the at least one fluid injector device based on the pressure differential,
        compare the calculated change in compliance volume with the predetermined fluid flow rate;
        repeat the steps throughout the fluid injection procedure, and
        determine whether an occlusion or a partial occlusion has occurred downstream of the at least one fluid injector device if the calculated change in compliance volume is equal to or greater than a predetermined threshold of a volumetric component of the predetermined fluid flow rate; and
        if the occlusion or the partial occlusion is determined to have occurred, the at least one processor is programmed or configured to reduce or stop a delivery rate of the at least one piston of the at least one fluid injector device.

2. The fluid injector system of claim 1, wherein the calculated change in compliance volume is compared with the predetermined fluid flow rate to determine a calculated true fluid flow rate measurement.

3. The fluid injector system of claim 2, wherein if the calculated true fluid flow rate is less than or equal to a predetermined percentage of the predetermined fluid flow rate, it is determined that an occlusion has occurred downstream of the at least one fluid injector device.

4. The fluid injector system of claim 1, wherein if the calculated change in compliance volume is within or approaching the predetermined threshold of the volumetric component of the predetermined fluid flow rate, it is determined that an at least partial occlusion may have occured or has occurred downstream of the at least one fluid injector device.

5. The fluid injector system of claim 4, wherein the at least one processor is programmed or configured to reduce a delivery rate of the at least one piston of the at least one fluid injector device if the change in calculated compliance volume is within or approaching the predetermined threshold of the volumetric component of the predetermined fluid flow rate.

6. The fluid injector system of claim 1, wherein the at least one processor is programmed or configured to determine when a pre-programmed pressure limit of the at least one fluid injector device has been reached, and wherein the at least one processor is programmed or configured to subtract the calculated change in compliance volume from a volumetric component of the delivery rate of the at least one piston of the at least one fluid injector device to determine a calculated true fluid flow rate out of the at least one fluid injector device.

7. The fluid injector system of claim 6, wherein the at least one processor is programmed or configured to adjust the delivery rate of the at least one piston of the at least one fluid injector device so the calculated true fluid flow rate is substantially the same as the predetermined fluid flow rate.

8. A computer-implemented method of at least partial occlusion detection and pressure limiting for a fluid injector system configured for use in administering at least one fluid in a fluid injection procedure, the method comprising:

providing, with a control device comprising at least one processor, instructions to the fluid injector system having at least one piston to administer the at least one fluid to deliver the at least one fluid from at least one fluid injector device at a predetermined fluid flow rate;

determining a first fluid pressure measurement within the at least one fluid injector device at a first time;

determining a second fluid pressure measurement within the at least one fluid injector device at a second time;

determining, with the control device, a pressure differential between the first fluid pressure measurement and the second fluid pressure measurement;

calculating, with the control device, a change in compliance volume of the at least one fluid injector device based on the pressure differential;

comparing, with the control device, the calculated change in compliance volume with the predetermined fluid flow rate;

repeating the method steps throughout the fluid injection procedure; and determining whether an occlusion or a partial occlusion has occurred downstream of the at least one fluid injector device if the calculated change in compliance volume is equal to or greater than a predetermined threshold of a volumetric component of the predetermined fluid flow rate; and if the occlusion or the partial occlusion is determined to have occurred, the at least one processor is programmed or configured to reduce or stop a delivery rate of the at least one piston of the at least one fluid injector device.

9. The computer-implemented method of claim 8, further comprising comparing the calculated change in compliance volume with the predetermined fluid flow rate to determine a calculated true fluid flow rate measurement.

10. The computer-implemented method of claim 9, further comprising determining, with the control device, that an occlusion has occurred if the calculated true fluid flow rate is less than or equal to a predetermined percentage of the predetermined fluid flow rate.

11. The computer-implemented method of claim 8, further comprising determining if the at least partial occlusion has occurred and reducing, with the control device, a delivery rate of the at least one piston of the at least one fluid injector device if the calculated change in compliance volume is within or approaching the predetermined threshold of the volumetric component of the predetermined fluid flow rate.

12. The computer-implemented method of claim 8, further comprising determining, with the control device, when a pre-programmed pressure limit of the at least one fluid injector device has been reached, and wherein the first time at which the first fluid pressure measurement is determined is a time before the pre-programmed pressure limit is reached, and wherein the second time at which the second fluid pressure measurement is determined is a time at which or after the pre-programmed pressure limit is reached.

13. The computer-implemented method of claim 8, further comprising subtracting, with the control device, the calculated change in compliance volume from a volumetric component of the delivery rate of the at least one piston of the at least one fluid injector device to determine a calculated true fluid flow rate out of the at least one fluid injector device.

14. The computer-implemented method of claim 13, further comprising adjusting, with the control device, a delivery rate of the at least one piston of the at least one fluid injector device so the calculated true fluid flow rate is substantially the same as the predetermined fluid flow rate.

* * * * *